United States Patent
Lee et al.

(10) Patent No.: US 7,389,094 B2
(45) Date of Patent: *Jun. 17, 2008

(54) WIRELESS DATA COMMUNICATIONS USING FIFO FOR SYNCHRONIZATION MEMORY

(75) Inventors: Sherman Lee, Rancho Palos Verdes, CA (US); Vivian Y. Chou, Alhambra, CA (US); John H. Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/796,837

(22) Filed: Apr. 30, 2007

(65) Prior Publication Data

US 2007/0202827 A1 Aug. 30, 2007

Related U.S. Application Data

(60) Continuation of application No. 10/413,689, filed on Apr. 15, 2003, now Pat. No. 7,228,392, which is a division of application No. 09/593,583, filed on Jun. 12, 2000, now Pat. No. 6,650,880.

(51) Int. Cl.
*H04B 1/06* (2006.01)

(52) U.S. Cl. ............... 455/259; 455/41.1; 455/265; 375/372

(58) Field of Classification Search ............. 455/412.1, 455/41.1, 556.1, 557, 259, 265; 375/372, 375/354, 359; 711/167
See application file for complete search history.

(56) References Cited

U.S. PATENT DOCUMENTS 4,897,813 A 1/1990 Kumbasar

| 5,587,953 | A | 12/1996 | Chung |
| 5,732,324 | A | 3/1998 | Rieger |
| 5,757,690 | A | 5/1998 | McMahon |
| 5,757,872 | A | 5/1998 | Banu |
| 5,796,972 | A | 8/1998 | Johnson |
| 5,796,974 | A | 8/1998 | Goddard |
| 5,956,748 | A | 9/1999 | New |
| 6,055,285 | A | 4/2000 | Alston |

(Continued)

FOREIGN PATENT DOCUMENTS

EP 0 417 390 A2 3/1991

OTHER PUBLICATIONS

"European Search Report Application No. EP 01 25 0211", European Patent Office, Munich, Germany, (Oct. 26, 2004),4 pages.
"Specification of the Bluetooth System", Version 1.0B, (Dec. 1, 1999),1-1082.
Kwon, Hyuck M., et al., "Improved Zero-If Zero-Crossing Demodulator for Gaussian Minimum Shift Keying Signals in Land Mobile Channels", Wichita State University, Wichita, US, (May 1996),5 pages.

(Continued)

*Primary Examiner*—Kevin L Ellis

(57) ABSTRACT

A microprocessor system architecture is disclosed which allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion. When a patch is received, it is loaded into system RAM along with instructions or other appropriate signals to direct the execution of the patched or updated microcode from RAM instead of the existing ROM microcode. Various methods are presented for selecting the execution of the appropriate microcode depending upon whether there have been changes made to it.

19 Claims, 24 Drawing Sheets

U.S. PATENT DOCUMENTS

| | | |
|---|---|---|
| 6,260,157 B1 | 7/2001 | Schurecht |
| 6,266,385 B1 | 7/2001 | Roy |
| 6,351,822 B1 | 2/2002 | Wright |
| 6,438,664 B1 | 8/2002 | McGrath |
| 6,650,880 B1 | 11/2003 | Lee |
| 6,804,772 B2 | 10/2004 | Lee et al. |
| 7,167,727 B2 | 1/2007 | Lee et al. |
| 2003/0194982 A1 | 10/2003 | Lee et al. |
| 2004/0209587 A1 | 10/2004 | Lee et al. |
| 2005/0010745 A1 | 1/2005 | Lee et al. |

OTHER PUBLICATIONS

Pham, N. G., et al., "A High Throughput, Asynchronous, Dual Port FIFO Memory Implemented in ASIC Technology", *NCR Corporation*, Colorado Springs, US, (May 1989),4 pages.

Prophet, Graham , "Living in a Wireless Wonderland", *EDN Magazine*, (Jun. 5, 2000),9 pages.

Watola, Dave , "DS2 Digital Receiver Signal Processing Description", (Apr. 7, 1998),1-12.

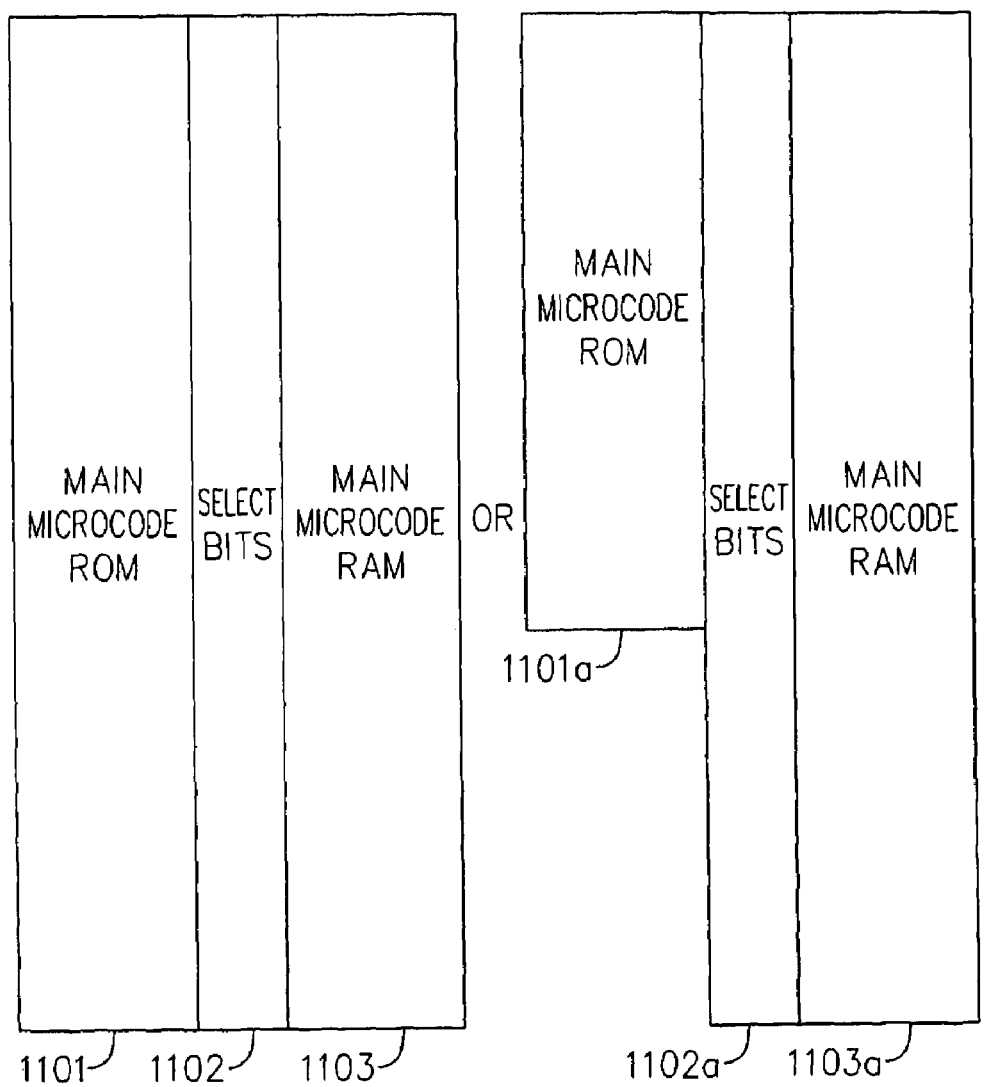

SELECT METHOD #2

SELECT METHOD #3-UNPATCHED

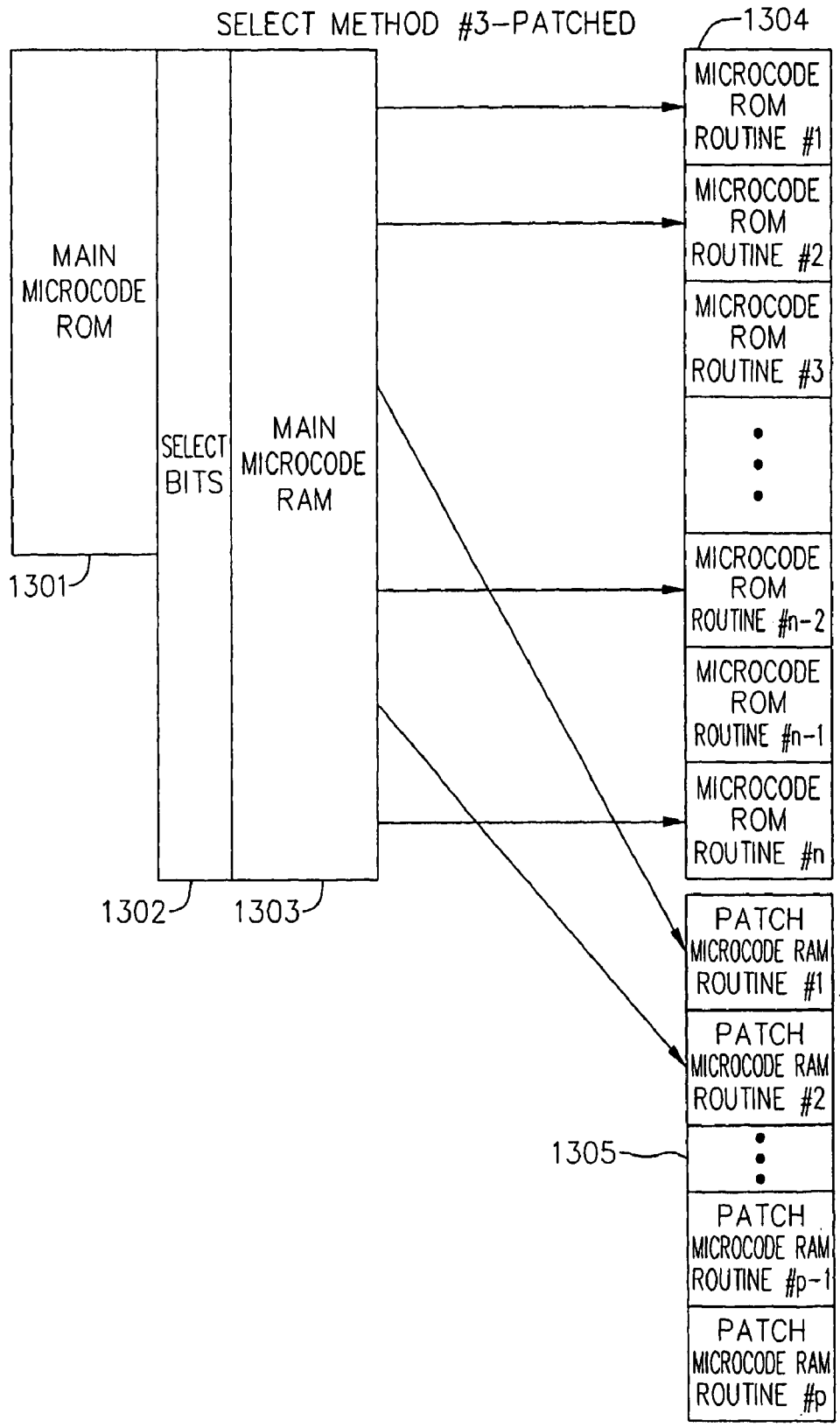

SELECT METHOD #3-UPDATED

FIG. 7A
VALID/TRAP METHOD-UNPATCHED
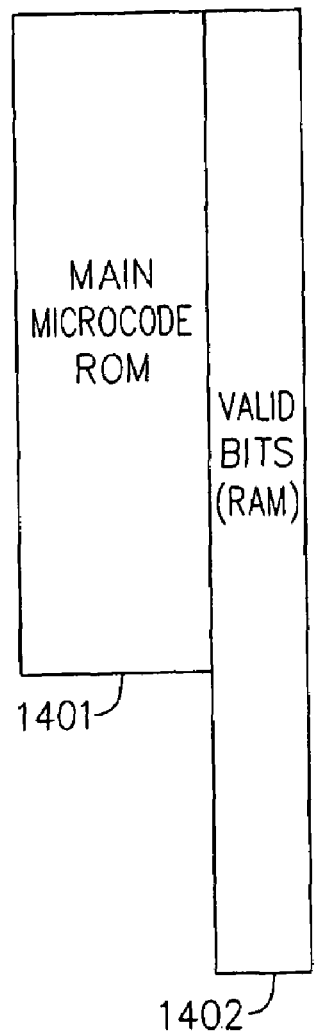
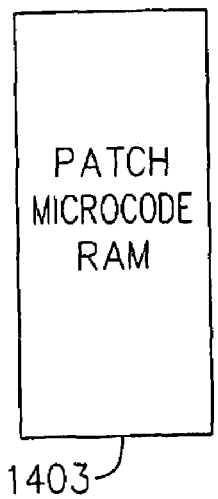

VALID/TRAP METHOD-PATCHED

VALID/TRAP METHOD-UPDATED

INDEX METHOD—UNPATCHED

INDEX METHOD-PATCHED

INDEX METHOD-UPDATED

WIRELESS DATA COMMUNICATIONS USING FIFO FOR SYNCHRONIZATION MEMORY

TECHNICAL FIELD

This application is a continuation application of, and claims priority to, application Ser. No. 10/413,689, filed Apr. 15, 2003, now U.S. Pat. No. 7,228,392, which is a divisional application of and claims priority to patent application Ser. No. 09/593,583, filed Jun. 12, 2000, now U.S. Pat. No. 6,650,880, the content of all which are incorporated herein by reference.

BACKGROUND

This disclosure relates to wireless communication and more particularly to an apparatus that receives transmission of data synchronized to a clock that is out of phase with the clock of the apparatus.

This disclosure also relates to microprocessor system architecture, and more particularly to a microprocessor architecture that allows read-only memory (ROM) microcode to be effectively altered or enhanced without the need to reprogram or replace the ROM.

Bluetooth is the name of a well known and open technical specification for wireless communication of data and voice. Bluetooth allows the replacement of very short range cables (wires) now used to connect one device to another with one universal short-range radio link; for example, a computer can thereby communicate with its printer via a radio link instead of a cable. Bluetooth is characterized by operation in the 2.4 GHz and at variable transmission power depending on the distance between devices. For example, for a power class 2 Bluetooth device, the transmission power ranges from 1 mW to 2.5 mW. Bluetooth also allows computing devices to connect to a communicating device via a radio link. For example, a computer can communicate with a nearby cell phone via a radio link to access the Internet. Bluetooth units (radios) connect to each other in "piconets", which are formed by a master unit connecting up to seven slave units. In a piconet, the slave units are synchronized to the master unit's clock and hopping sequence. See "Specification of the Bluetooth System-Core v 1.0b" available from the Bluetooth Special Interest Group at its web site.

A typical Bluetooth conforming radio includes an RF (radio frequency) circuit and a baseband circuit. The RF circuit receives a frequency modulated electromagnetic signal (i.e., FM signal) carrying data synchronized to the clock signal ("external clock") of another Bluetooth radio. The baseband circuit includes a demodulator circuit that extracts the data and the external clock signal from the FM signal (symbol timing recovery). The baseband circuit also includes a PLL (phase lock loop) circuit that synchronizes the phase of the internal clock of the baseband circuit to the phase of the external clock to allow data processing circuits of the baseband to process the extracted data. The PLL circuit is necessary because even if the internal clock and the external clock may have substantially the same frequency, they may not have the same phase. Furthermore, interference to the FM signal as it travels through the air may also distort the representation of the frequency of the external clock in the FM signal.

A microprocessor is a central processing unit (CPU) enclosed in one integrated circuit (IC) package. Because of their small size and low cost, microprocessors have revolutionized digital system design technology, giving the designer the capability to create structures that were previously uneconomical. Microprocessors are used in a wide variety of applications. They can function as a CPU in a general purpose computer or as a processor unit in a special purpose, automated system.

Microprocessor systems usually incorporate several different types of memory devices to hold data for processing and instructions for system control. Memory devices come in a wide variety of forms. Two of the more common forms are generally referred to as "read-only memory" (ROM) and "random access memory" (RAM). In its simplest form, sometimes called "mask-programmed", a ROM memory device is manufactured with fixed contents. The binary information stored in the ROM is made permanent during the hardware production of the unit and cannot subsequently be altered. Such a ROM memory unit performs the read operation only; it does not have a write capability. ROM is most often used to hold microcode, the lowest level instructions that directly control a microprocessor.

By contrast, a RAM is a data storage device that can perform both the read and write function. A system CPU uses its RAM as a storage area for data, calculation results, and program instructions, drawing on this storage as necessary to perform the tasks required by programs. Its binary contents can easily be changed during operation and its stored data is typically erased or lost when the device incorporating it is powered off. Part of the initial "power-up" or boot routine for microprocessor systems includes the loading of desired or necessary code into RAM according to the system design.

Microprocessor systems may also incorporate some type of "non-volatile" memory, such as a hard-disk. Like RAM, such memory can usually be read or written to, but unlike RAM its content is preserved until over-written, even without system power.

More recent varieties of ROM provide for some limited programming capability after manufacture. PROM ("programmable read-only memory") devices can be programmed by the end user, but only once. EPROM ("erasable programmable read-only memory") can be erased and then reprogrammed, but must be removed from the system to do so. EEPROM ("electronic erasable read-only memory") can be erased and programmed electrically some limited number of times with standard supply voltages while in the circuit. However, such devices come with increased cost and limitations of their own. For example, EPROM must be removed from the system to be reprogrammed, and EEPROM must be erased and reprogrammed in its entirety, not selectively. For many processing systems, especially those used to perform set, repetitive tasks, it is desirable to use the cheapest and simplest (mask-programmed) ROM, with minimal reliance on more expensive RAM or other types of memory devices.

However, in even the simplest microprocessor system it may be desirable to alter the execution of the ROM microcode to, for example, correct errors in the code or add new capabilities to it. Alterations in the processing of ROM microcode are possible without incurring the added expense and complexity of integrating some form of programmable ROM into the system.

SUMMARY

In accordance with one aspect, a wireless device (e.g. radio) includes a receiver coupled to a first-in first-out memory device (FIFO). The, e.g. RF receiver includes a RF circuit that receives RF signals via an antenna, and a demodulator circuit that decodes the RF signals to data signals and recovered clock signals. The RF receiver stores the data signals into the FIFO using the recovered clock signals as write signals. In one implementation, a host device reads the data out from the FIFO with read signals synchronized to the system clock of the host device. In one variation, the write signals and the read signals are of similar frequencies. Thus, the host device can read the data received as RF signals without synchronizing its system clock to the recovered clock signals.

In another embodiment, a data processing circuit reads the data out from the FIFO with read signals synchronized to the system clock of the data processing circuit. In one implementation, the write signals and the read signals are of similar frequencies. Thus, the data processing circuit can process the data received as RF signals without synchronizing its system clock to the recovered clock signals. In one variation, the host device is coupled to the data processing circuit to receive the processed data.

Accordingly, the function performed in the prior art by PLL circuits are performed by FIFOs so that data received as RF signals may be processed by circuits without synchronizing their system clock to the recovered clock signals.

In accordance with another aspect, a microprocessor system architecture allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion.

When a patch is received, it is loaded into system RAM along with instructions or other appropriate signals to direct the execution of the patched or updated microcode from RAM instead of the existing ROM microcode. Those skilled in the art will appreciate and understand that a variety of techniques can be utilized to direct the execution of patched or updated RAM microcode rather than corresponding ROM microcode, only a few of which are discussed in some detail below.

BRIEF DESCRIPTION OF THE DRAWINGS

FIGS. 4 and 4A illustrate alternative embodiments of a memory architecture in which main microcode ROM and main microcode RAM share a common memory address area, along with a "select" RAM bit used to control the selection of main microcode ROM or main microcode RAM for execution. In FIG. 4, all microcode ROM is associated with an area of microcode RAM. In FIG. 4B, all microcode ROM shares a common address with microcode RAM, but additional address areas for microcode RAM are allocated to accept new microcode.

FIGS. 6A, 6B, and 6C illustrate a memory architecture in which the ROM is divided into main portion and a "routine" portion consisting of more detailed and lengthy instruction. A specified RAM bit is used to control the selection of main microcode ROM or main microcode RAM, and associated "routine" ROM or patches loaded into RAM. FIG. 6A illustrates the selection of microcode ROM in the absence of any patches. FIG. 6B illustrates the selection of patch microcode RAM when present, and FIG. 6C illustrates the selection of patch microcode RAM when new routines are available.

FIGS. 7A, 7B, and 7C illustrate a memory architecture in which a specified RAM bit is used to control the selection of main microcode ROM or patch microcode RAM. FIG. 7A illustrates the selection of main microcode ROM in the absence of any changes. FIG. 7B illustrates the selection of patch microcode RAM when changes are present, and FIG. 7C illustrates the selection of patch microcode RAM when new instructions are present.

FIG. 8A shows how ROM routines are mapped into RAM for execution in the absence of any patches or updates. FIG. 8B illustrates how RAM-mapped ROM routines are directed to patch microcode RAM for execution when existing RAM microcode is modified. FIG. 8C illustrates how new microcode routines are executed.

DETAILED DESCRIPTION

Figure 1:
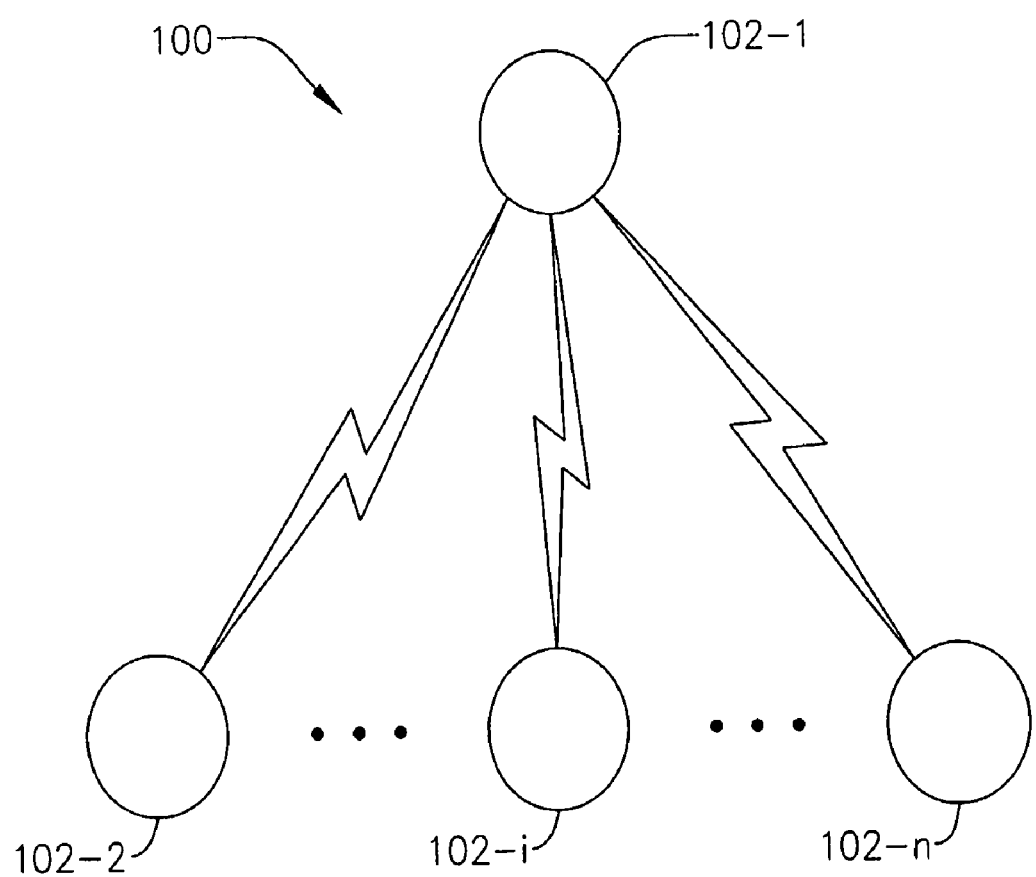
FIG. 1 illustrates, in a block diagram, a wireless network involving wireless devices.

A wireless network 100 (FIG. 1) includes a plurality of wireless devices 102-1, 102-2 . . . 102-i . . . 102-n (2.ltoreq.i.ltoreq.n). Wireless network 100 includes radio frequency (RF) networks, optical networks, and infrared networks. Wireless network 100 is, for example, a Bluetooth piconet where wireless device 102-1 is a master Bluetooth radio and wireless devices 102-2 to 102-n are slave Bluetooth radios. As one skilled in the art understands, a Bluetooth piconet can form part of a larger Bluetooth scatternet.

Figure 2A:
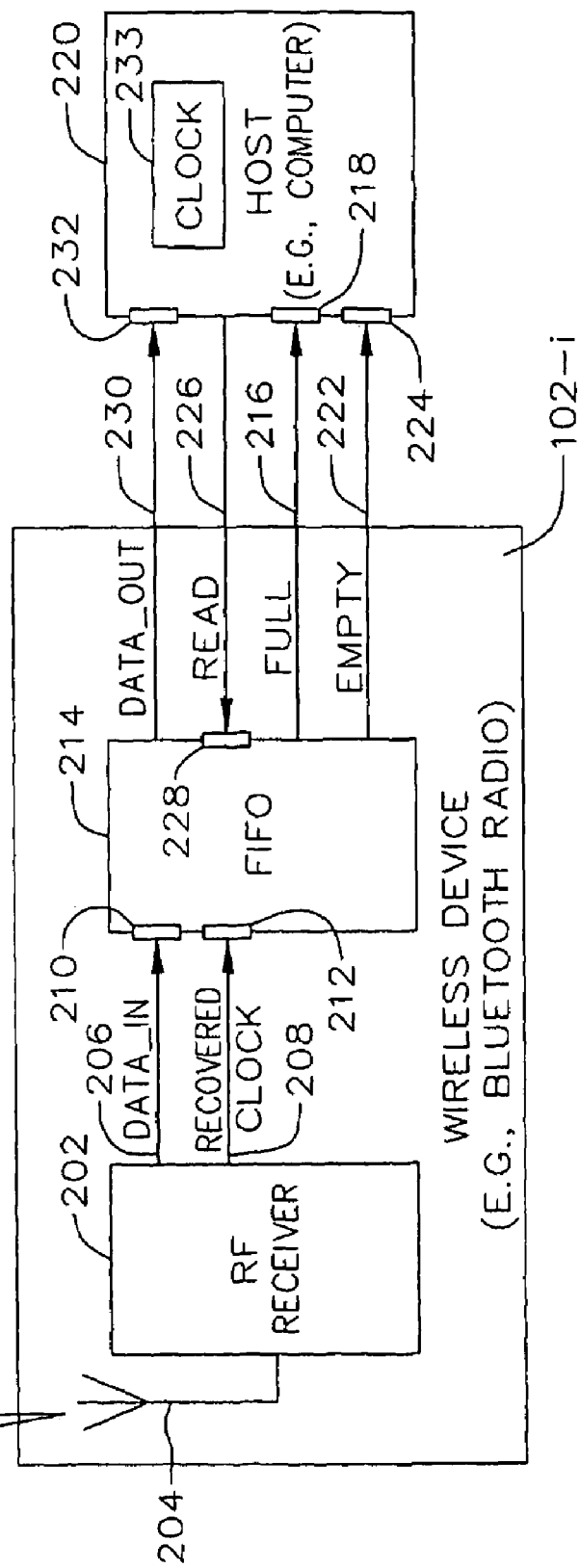
FIG. 2A illustrates, in a block diagram, a wireless device of FIG. 1 in accordance with one embodiment.

In accordance with one aspect hereafter referred to as "thin baseband/host-based", wireless device 102-i (FIG. 2A)

performs radio and baseband modulation functions in circuitry. A host 220 performs all other baseband, link management, and protocol stack functions through software. Host 220 includes a high performance and low latency host processor (e.g., reduced instruction-set computing processors) capable of handling time-critical link management functions. Such processors are available from ARM Ltd. of Cambridge, England, MIPS Technologies, Inc. of Mountain View, ARC Cores, Inc. of San Jose, and Tensillica of Santa Clara.

Wireless device 102-i includes in one embodiment a conventional radio frequency (RF) receiver 202 (FIG. 2A) that receives RF signals from another Bluetooth radio via an antenna 204. The RF signals carry data synchronized to the clock ("external clock") of the another Bluetooth radio. RF receiver 202 decodes the RF signals to recover the data signals and the external clock signals (symbol timing recovery). RF receiver 202 respectively outputs the data signals and the external clock signals via respective lines 206 and 208.

Lines 206 and 208 are respectively coupled to input terminals 210 and 212 of a conventional first-in first-out memory device (FIFO) 214. FIFO 214 receives the external clock signals ("recovered clock signals") as write signals from RF receiver 202. When FIFO 214 receives an active recovered clock signal on terminal 212, FIFO 214 writes the data signal received on terminal 210 from RF receiver 202 into one of its empty memory locations indicated by a write pointer. Thus, the input data to FIFO 214 is in response to the recovered clock signals.

When FIFO 214 is full, it outputs an active full signal via a line 216 coupled to a terminal 218 of host 220. Conversely, when FIFO 214 is empty, it outputs an active empty signal via a line 222 coupled to a terminal 224 of host 220. Host 220 reads the data stored in FIFO 214 by driving an active read signal via a line 226 coupled to input terminal 228 of FIFO 214. In response to the active read signal on its terminal 228, FIFO 214 outputs the data in the memory location pointed to by a read pointer via a line 230 coupled to an input terminal 232 of host 220. Since the read signal from host 220 is synchronized with a clock 233 of host 220, the data read out of FIFO 214 is synchronized with clock 233.

Figure 2B:
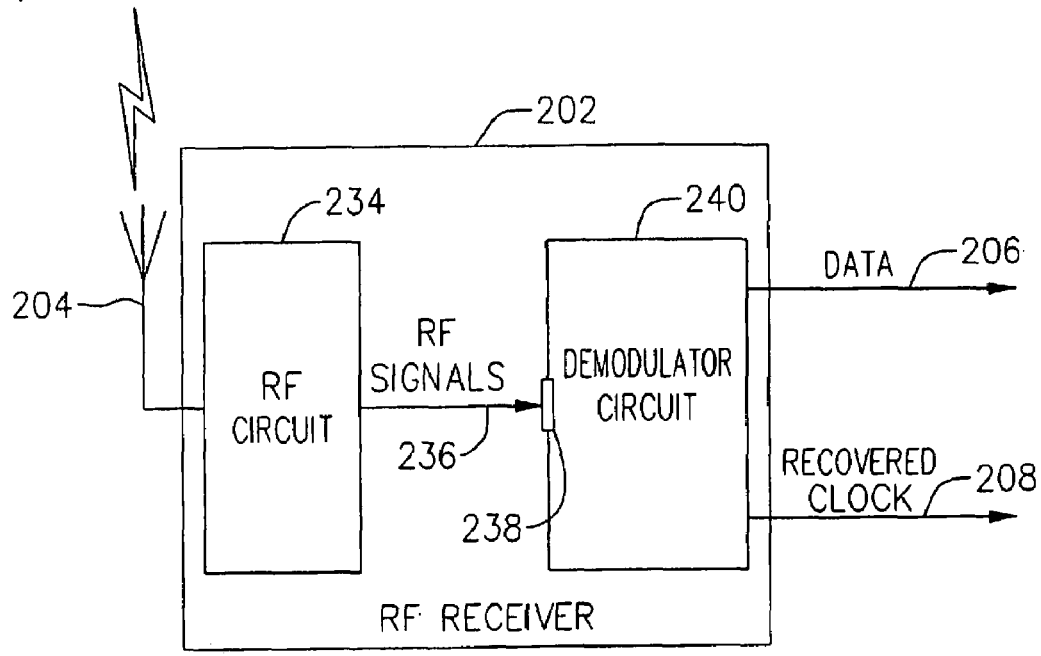
FIG. 2B illustrates, in a block diagram, a radio frequency (RF) receiver of FIG. 2A.

In one embodiment, RF receiver 202 comprises a suitable RF circuit 234 (FIG. 2B) that receives the FM signals transmitted by other Bluetooth radio(s). For a description of one embodiment of RF circuit 234, see U.S. Pat. No. 6,560,449, entitled "Image-Rejection I/Q Demodulators," and U.S. Pat. No. 6,778,594, entitled "Receiver Architecture Employing Low Intermediate Frequency And Complex Filtering," which are incorporated herein by reference in the entirety. Another suitable embodiment of RF circuit 234 is Radio Module PBA31 301 from Ericsson.

RF circuit 234 outputs the RF signals via a line 236 coupled to a terminal 238 of a suitable demodulator circuit 240. Demodulator circuit 240 extracts the data signals and the recovered clock signals from the RF signals. Demodulator circuit 240 outputs the data signals and the recovered clock signals via respective lines 206 and 208. Demodulator circuit 240 is, for example in one embodiment, implemented by Verilog source code listed in Appendix A. Another example of a suitable demodulator is modeled by C source code listed in Appendix B. One skilled in the art can translate the C source code to Verilog source code to synthesize a suitable demodulator.

Figure 2C:
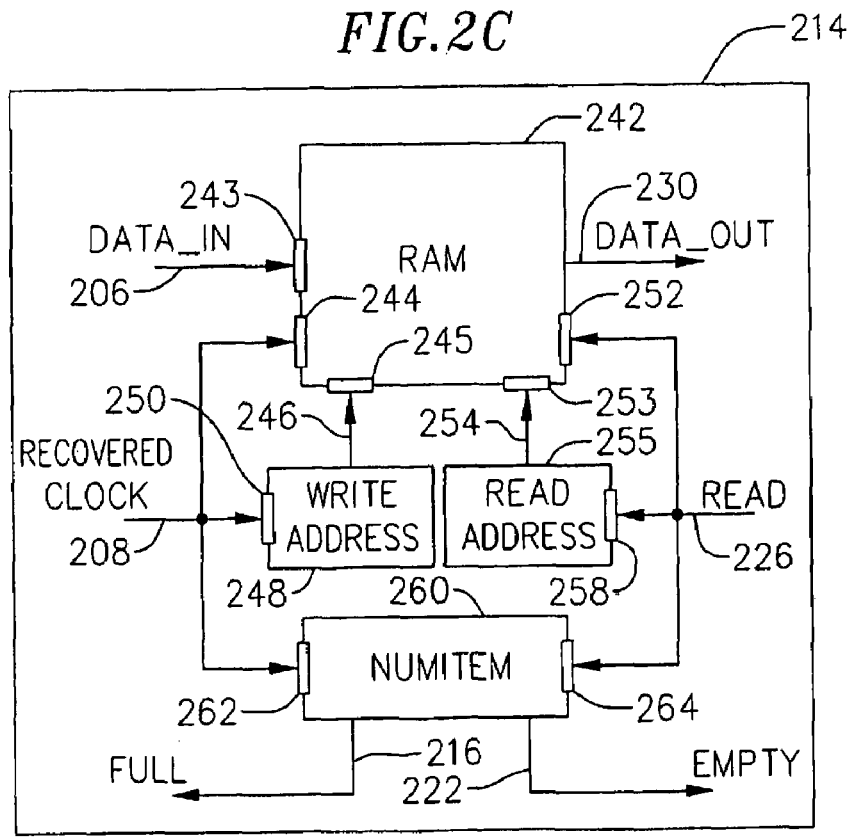
FIG. 2C illustrates, in a block diagram, a first-in first-out memory device (FIFO) of FIG. 2A.
Figure 2D:
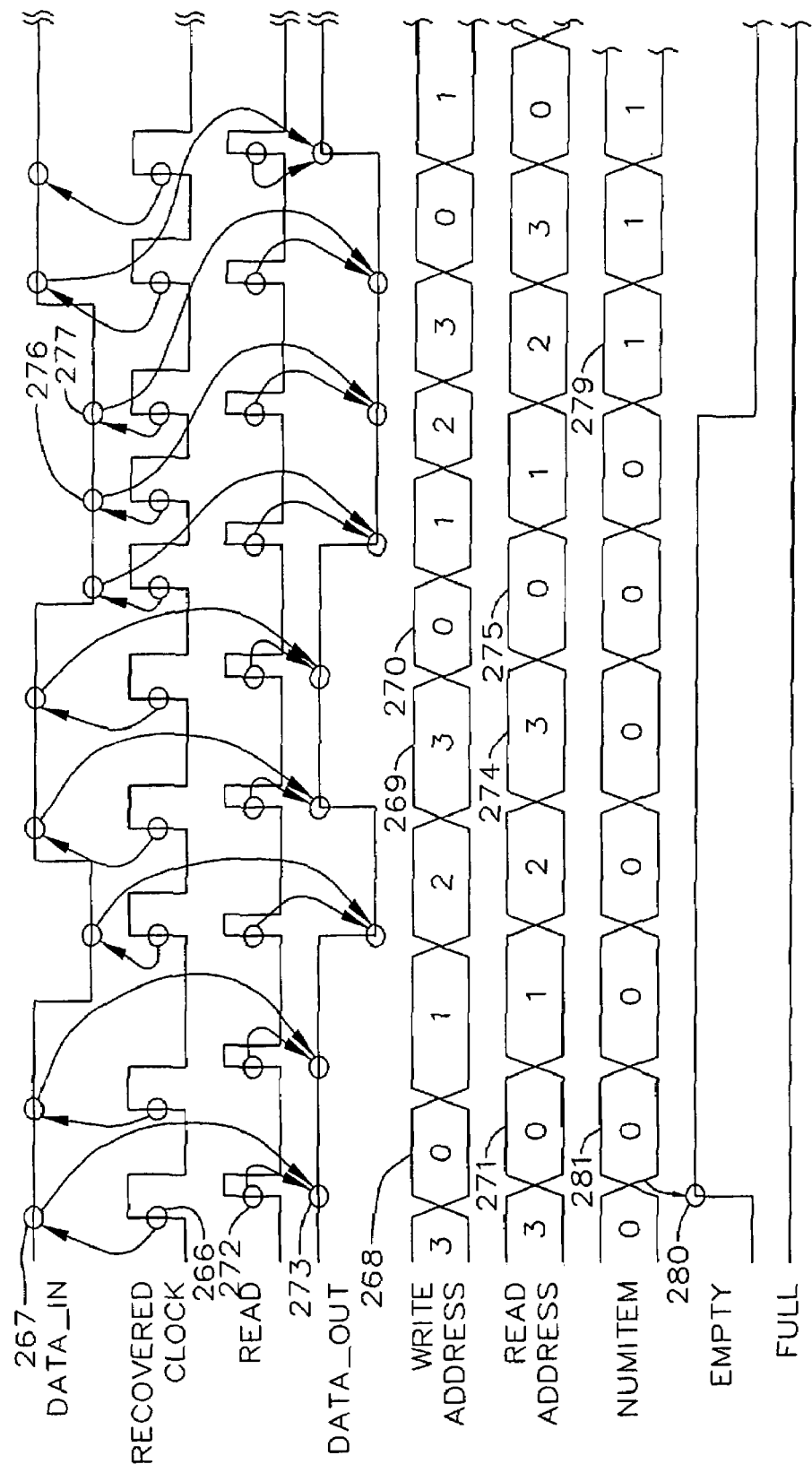
FIG. 2D illustrates, in a timing diagram, the input and output signals from the FIFO of FIG. 2C in accordance with one embodiment.

In one embodiment, FIFO 214 includes a random access memory (RAM) 242 (FIG. 2C) that receives data on a terminal 243 coupled to line 206, write signals (i.e., recovered clock signals) on a terminal 244 coupled to line 208, and write addresses on a terminal 245 coupled to a line 246 of a counter (write pointer) 248. RAM 242 stores the data (e.g., data 267 in FIG. 2D) received on a terminal 243 in the write address (e.g., address 268 in FIG. 2D) indicated by counter 248 each time RAM 242 receives an active write signal (e.g., signal 266 in FIG. 2D) on terminal 243. Counter 248 increments the write address each time counter 248 receives an active write signal (e.g., signal 266 in FIG. 2D) on a terminal 250 coupled to line 208. Counter 248 wraps around once it reaches the total number of memory locations in RAM 242 (e.g., the transition from address 269 to 270).

RAM 242 further receives a read signal on a terminal 252 coupled to line 226, and a read address on a terminal 253 coupled to a line 254 of a counter (read pointer) 255. RAM 242 outputs the data (e.g., data 273 in FIG. 2D) in the memory address (e.g., address 271 in FIG. 2D) indicated by counter 255 each time RAM 242 receives an active read signal (e.g., signal 272 in FIG. 2D) on a terminal 252. Similar to counter 248, counter 255 increments the read address each time counter 255 receives an active read signal (e.g., signal 272 in FIG. 2D) on a terminal 258 coupled to line 226. Counter 255 wraps around once it reaches the total number of memory locations in RAM 242 (e.g., transition from address 274 to 275 in FIG. 2D).

A counter 260 stores a numitem that indicates whether RAM 242 is full or empty. Counter 260 increments the numitem each time it receives an active write signal on a terminal 262 coupled to line 208. Conversely, counter 260 decrements the numitem each time it receives an active read signal on a terminal 264 coupled to line 226. For example, when two data signals (e.g., data 276 and 277 in FIG. 2D) are written into RAM 242 while only one data signal (e.g., data 278 that corresponds to data 276 in FIG. 2D) is read out of RAM 242, numitem (e.g., numitem 279 in FIG. 2D) has a value of one. Counter 260 outputs an active full signal via line 216 when the numitem is equal to the total number of memory locations in RAM 242. Conversely, counter 260 outputs an active empty signal (e.g., signal 280 in FIG. 2D) via line 222 when the numitem (e.g., numitem 281 in FIG. 2D) is equal to zero.

In one embodiment, host 220 read data out from FIFO 214 at relatively the same rate as data is being written into FIFO 214 (i.e., the frequency of the recovered clock). If data is being read out from FIFO 214 at substantially the same rate as data is being written into FIFO 214, the size of FIFO 214 can be minimized (e.g., 2 bits). However, the write rate may not be as constant as the read rate because the write signal is synchronized to the recovered clock. Thus, the size of FIFO 214 is equal to the product of the (1) variation between the write rate and the read rate (e.g., frequency variation between the recovered clock and the system clock) and (2) the length of the data to be transmitted. Specifically, the minimum required size of the FIFO 214 between any two times (e.g., $t_1$ and $t_2$) may be defined as: $1 \, t \, 1 \, t \, 2 \, [F \text{ in }(t)\text{-}F \text{ out }(t)]t$ where $F.in(t)$ is the data rate into FIFO 214 as a function of time, and $F.out(t)$ is the data rate out from FIFO 214 as a function of time. In one implementation, FIFO 214 is a four bit FIFO.

In another embodiment, host 220 reads the data from FIFO 214 in bursts because host 220 operates at a higher clock speed than the recovered clock. Host 220 can allow the bits to be stored in FIFO 214 and read the data out in a burst before FIFO 214 overflows.

FIFO 214 is, for example in one embodiment, implemented by Verilog source code listed in Appendix C. As one skilled in the art understands, FIFOs can be implemented in a variety of ways by flip-flops, registers, memory arrays, random access memory (RAM), and other similar components.

As described above, FIFO 214 allows host 220 to read data signals transmitted from another Bluetooth radio without retiming its clock to the external clock of the other Bluetooth radio. Thus, the prior art PLL circuit is replaced here with one embodiment by a FIFO 214 that is both simple and inexpensive to implement. Accordingly, a Bluetooth radio utilizing FIFO 214 offers a more efficient design than other Bluetooth radios that utilize PLL circuits to retime their clocks.

In accordance with another aspect hereafter referred to as "host-based", wireless device 102-i performs all radio, baseband, and time-critical link management functions in circuitry rather than in the host. Host 220 performs all non-time critical link management and protocol stack functions (in software). Host 220 includes a host processor such as an X86 or 8051 based processor.

Wireless device 102-i includes a data processing circuit 302 (FIG. 3A) that reads and processes the data from FIFO 214. Data processing circuit 302 has terminals 318, 324, and 332 respectively coupled to lines 216, 222, and 230 of FIFO 214. To read data from FIFO 214, data processing circuit 302 drives an active read signal via a line 326 coupled to terminal 228 of FIFO 214.

In one embodiment, data processing circuit 302 includes a conventional forward error correction (FEC) decoding circuit 336 (FIG. 3B) having input terminal 338 coupled to line 230. FEC decoding circuit 336 uses correction bits embedded in the data to repair any error in the transmitted data received at terminal 338. If there is no error, FEC circuit 336 removes the correction bits from the data stream. This is as set forth in the Bluetooth specifications. FEC circuit 336 outputs the data stream via a line 340 to input terminal 342 of a de-whitening circuit 344.

Conventional de-whitening circuit 344 descrambles the data with a "whitening" word used to randomize the data from highly redundant patterns and to minimize DC bias in the packet. This is as set forth in the Bluetooth specifications. De-whitening circuit 344 outputs the data stream via a line 346 to input terminal 348 of a conventional cyclical redundancy check (CRC) circuit 350. CRC circuit 350 detects data transmission error by performing CRC checking. CRC circuit 350 outputs the data stream via a line 352 to input terminal 354 of a suitable FIFO 356.

FIFO 356 stores the data received from CRC circuit 350. FIFO 356 outputs the data via a line 349 coupled to input terminal 357 of a host interface 359. Host interface 359 reads data out from FIFO 356 (e.g., bits 370 to 377 in FIG. 3C) to an output line 330 coupled to terminal 232 of host 220 when host 220 outputs an inactive ready-to-receive signal (e.g., signal 378 in FIG. 3C) on a line 329 coupled to a terminal 361 of host interface 359. Host interface 359 includes a start bit and an end bit (e.g., bits 379 and 380, respectively, in FIG. 3C) at the start and the end of the data transmission to host 220. Host interface 359 is, for example, coupled to a XR16C850 UART (universal asynchronous receiver and transmitter) made by EXAR Corporation of Fremont, Calif., that forms part of host 220.

Figure 3A:
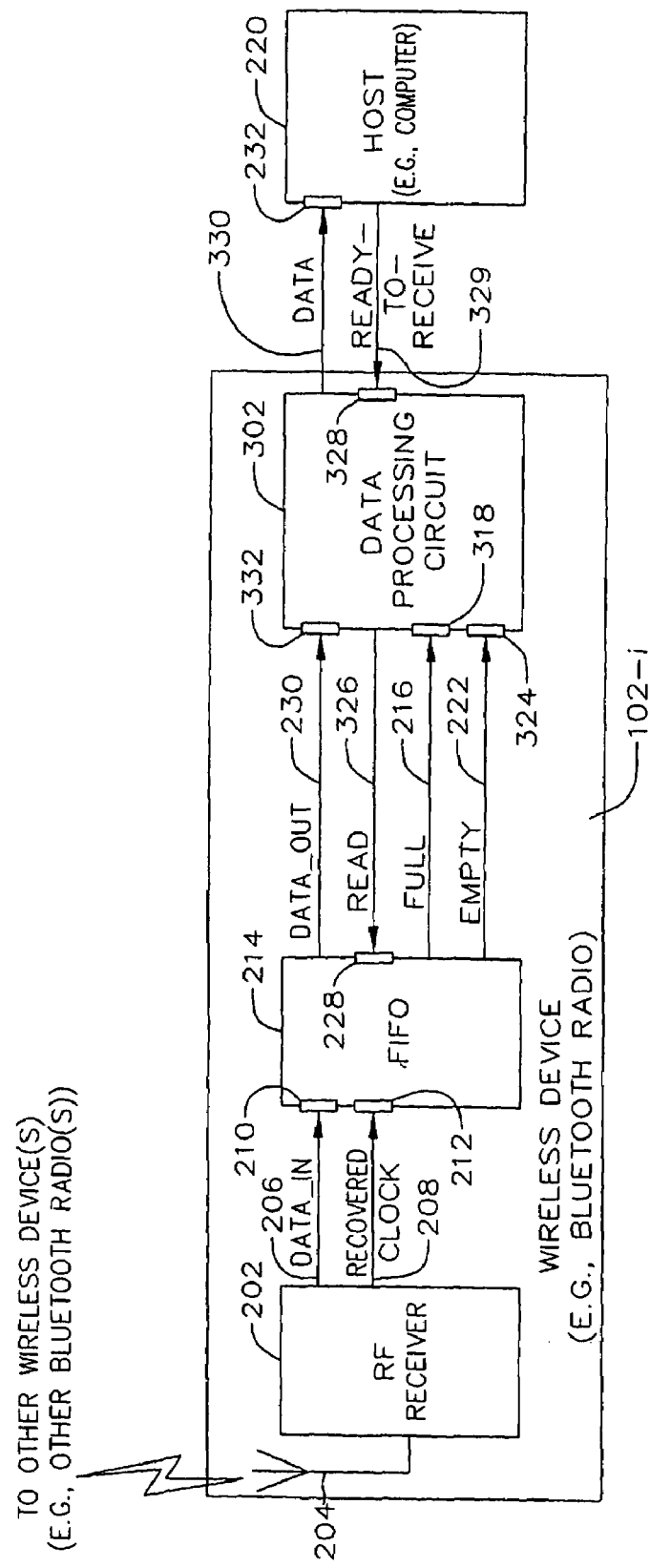
FIG. 3A illustrates, in a block diagram, a wireless device of FIG. 1 in accordance with another embodiment.
Figure 3B:
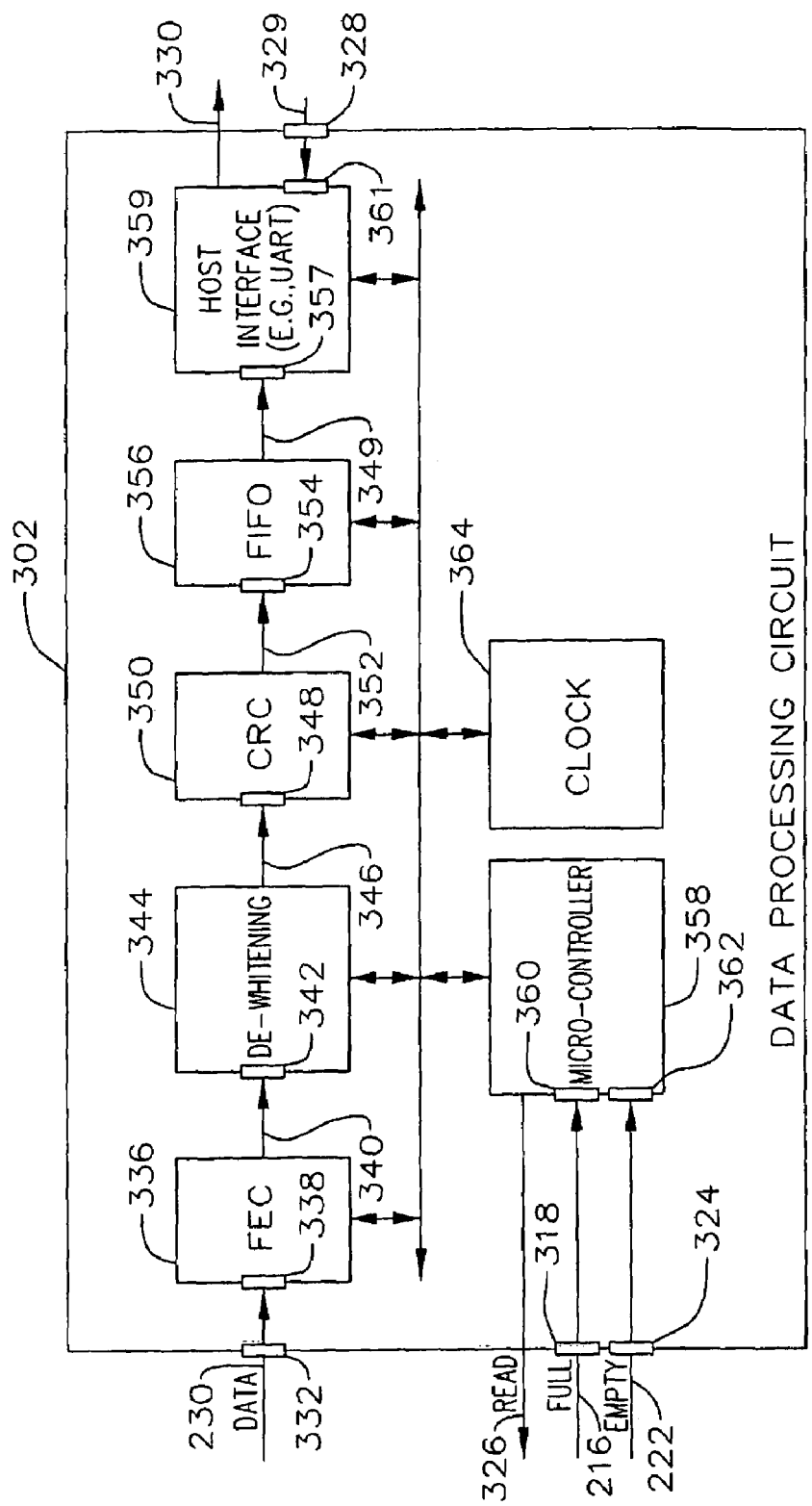
FIG. 3B illustrates, in a block diagram, a data processing circuit of FIG. 3A.
Figure 3C:
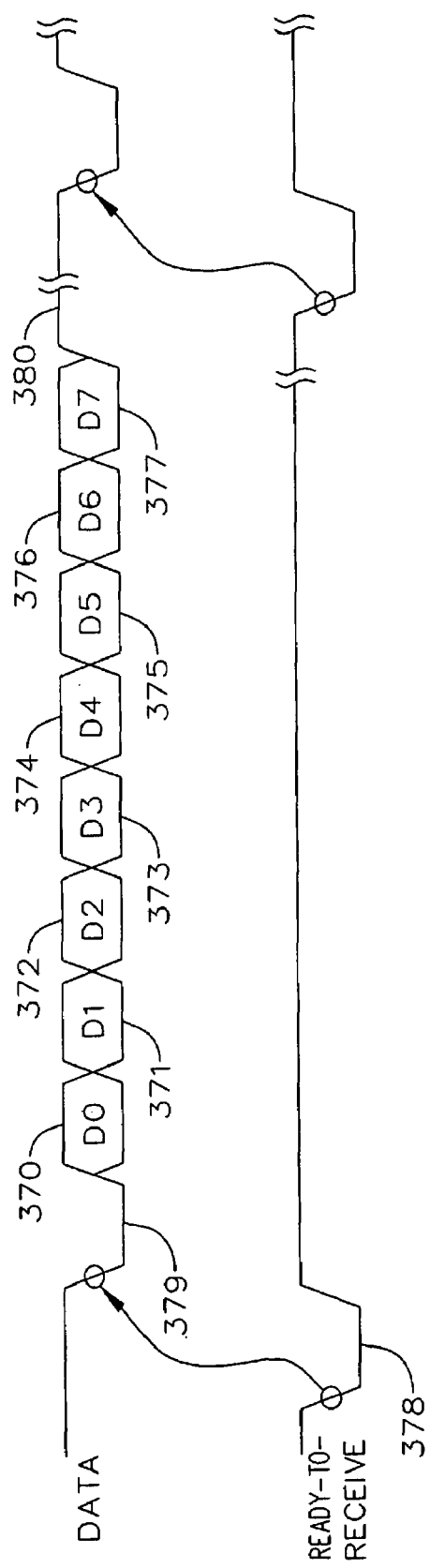
FIG. 3C illustrates, in a timing diagram, the input and output signals from a host interface of FIG. 3B in accordance with one embodiment.

A microcontroller 358 controls the data flow through FIFO 214, FEC circuit 336, de-whitening circuit 344, CRC circuit 350, FIFO 356, and host interface 359. (Microcontroller is not the host, which as in FIG. 3A is external to date processing circuit 302.) To read data from FIFO 214 to FEC circuit 336, microcontroller 358 drives an active read signal via a line 326 coupled to terminal 228 of FIFO 214. Microcontroller 358 has terminals 360 and 362 respectively coupled to lines 216 and 224 of FIFO 214 to determine if FIFO 214 is full or empty. Microcontroller 358 may read data out from FIFO 214 at a constant rate or in bursts depending on the embodiment.

Microcontroller 358 also enables FEC circuit 336, de-whitening circuit 344, and/or CRC circuit 350 depending on the type of data received. Microcontroller 358 instructs FIFO 356 whether to accept or reject the data received from CRC 350 depending if FEC 336 or CRC 350 detects an error in the data. Microcontroller 358, for example, executes microcode listed in Appendix D.

A clock source 364 provides clock signals to FEC circuit 336, de-whitening circuit 344, CRC circuit 350, FIFO 356, microcontroller 358, and host interface 359. Data processing circuit 302 is, for example, implemented by Verilog source code listed in Appendix F.

In accordance with yet another aspect hereafter referred as "stand alone", wireless device 102-i performs the radio, the base, and the link management functions in circuitry. Host 220 is not necessary in this aspect because data processing circuit 302 includes application specific circuitry that allows wireless device 102-i to operate independently of a host. For example, wireless device 102-i may be a wireless headset that allows a user to receive signals from another Bluetooth radio enabled device.

Although one aspect has been described with reference to particular embodiments, the description is only of examples and should not be taken as a limitation. For example, although the above disclosure refers to the Bluetooth specifications, the present method and apparatus may be used in other wireless applications where the data received is synchronized to a clock of similar frequency but out of phase with the internal clock. This is not limited to RF, but includes optical and infrared communications. Furthermore, radio 102-i can be implemented as an integrated circuit (on a single chip) or as separate chips that can be coupled. Various other adaptations and combinations of features of the embodiments disclosed are within the scope of the following claims.

As used herein, the term "patch" is intended to mean any correction, change, or alteration to the original microcode stored in a microprocessor system's read-only memory (ROM). The terms "patch" or "update" may also be used herein to refer to microcode developed after the original programming of system ROM microcode for the implementation of new instructions or routines.

As used herein, the term "microcode" is intended to mean the lowest level instructions that directly control a microprocessor.

There are several reasons why it might be desirable or even necessary to make changes in the programmed ROM of a microprocessor, corrections to existing code or the addition of new code being chief among them. For systems utilizing mask-produced (unalterable) ROM, such changes are not possible with existing memory and system architectures. Thus, to correct errors in the microcode, or to implement new capabilities, it is necessary to completely replace the defective or outmoded ROM devices if not the entire unit incorporating them, an expensive and inconvenient process.

Implementations disclosed herein effectively allow for changes in otherwise unalterable ROM microcode, by loading microcode changes into allocated RAM and then providing for the selective execution of the existing ROM microcode or the changed RAM microcode. The disclosed techniques can be applied to any microprocessor system, but will be most beneficial for those systems that for economic or other reasons primarily rely on ROM memory devices that are programmed at system manufacture and incapable of alteration once programmed.

Depending upon the particular embodiment, as more fully discussed below, each address of at least one portion of the designated RAM address area(s) will contain one or more control or "select" bits to signal a change to existing ROM microcode. During program execution, when the select bit is detected, the system is directed to execute the changed RAM microcode rather than existing ROM microcode.

The RAM is organized into storage units that are larger than the ROM storage units, and logically divided into two sections. The first section of each RAM storage unit is of the same fixed size as each ROM storage unit, and is used to store the changed or new (patched) microcode. The second section of each RAM storage unit is used to control the ultimate selection of either original ROM or RAM microcode for system execution. For those skilled in the art, it is well understood how to implement a memory system design of the type described for the RAM.

A multiplexer has its inputs coupled, respectively, to the ROM and to that section of the patch RAM containing the patch microcode, if any. The select input terminal of the multiplexer is coupled to the second section of patch RAM, containing the signal telling the system whether it is to execute the ROM or the patched RAM microcode. This input select signal is used by the multiplexer to select either a ROM or a patch RAM routine for output. The output of the multiplexer, whether ROM or patch RAM, is then processed for further execution.

Patch microcode can be introduced into the system in a variety of ways. It can be received and taken into the system in the same manner as other forms of data by, for example, modem, wireless data link, disk, or CD. Once received, the patch may be stored in any non-volatile memory device accessible by the system, where it will be available for subsequent loading into the patch RAM. Alternatively, when initially received from an external source, the patch microcode may be simultaneously loaded into patch RAM (for immediate use) and into nonvolatile memory for more permanent storage and future access.

There are a variety of methods for initiating the use of patch RAM microcode instead of or in addition to original ROM microcode, as discussed in the following embodiments.

FIGS. 4 and 4A illustrates an architecture in which ROM (1101 or 1101a), RAM (1103) and a RAM select bit share a common address. The select bit is used to determine whether the associated RAM or ROM instructions are to be executed.

Figure 8A:
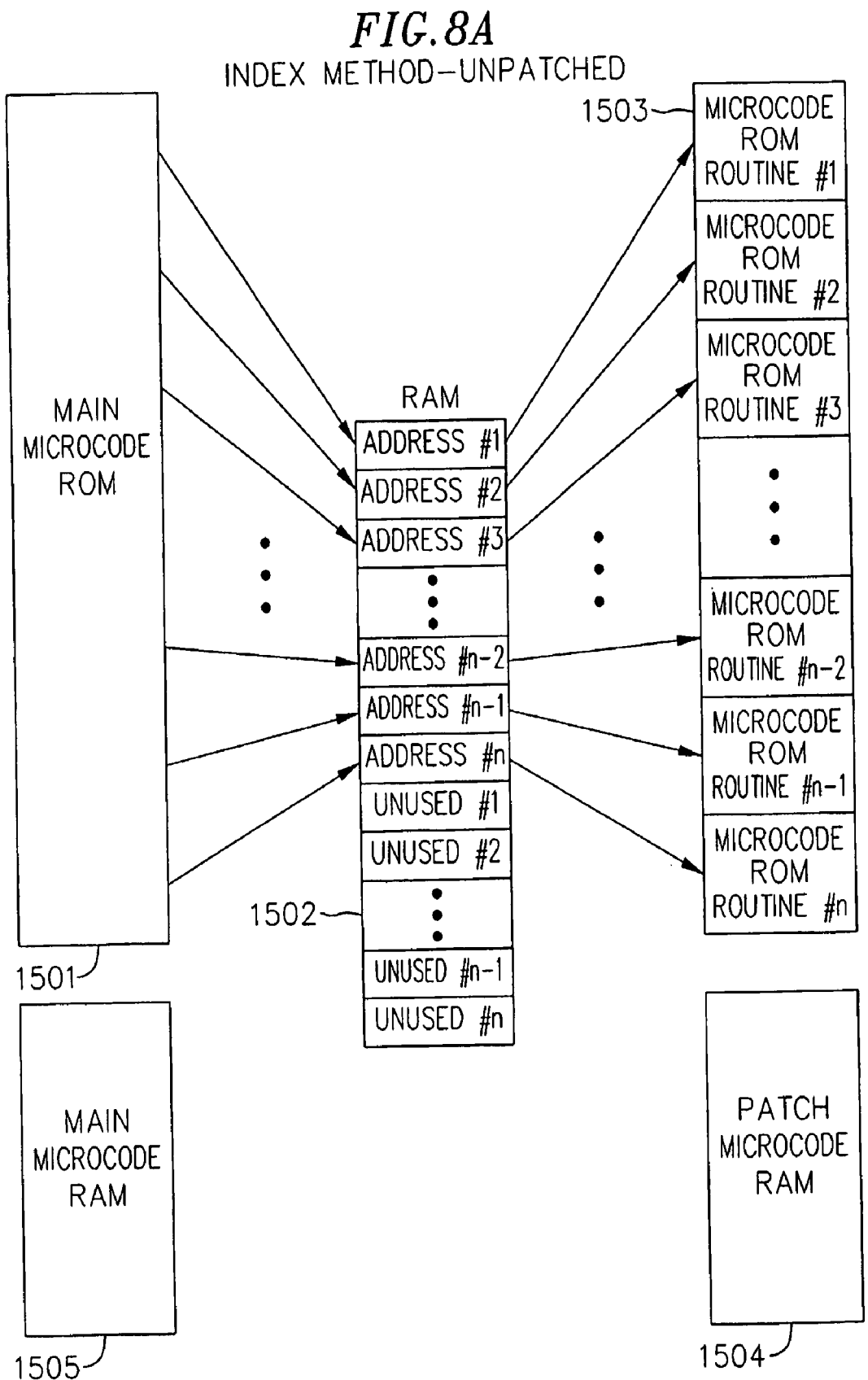
FIGS. 8A, 8B, and 8C illustrate a memory architecture in which an "index" method is used to select the execution of ROM or RAM microcode as desired.
Figure 8B:
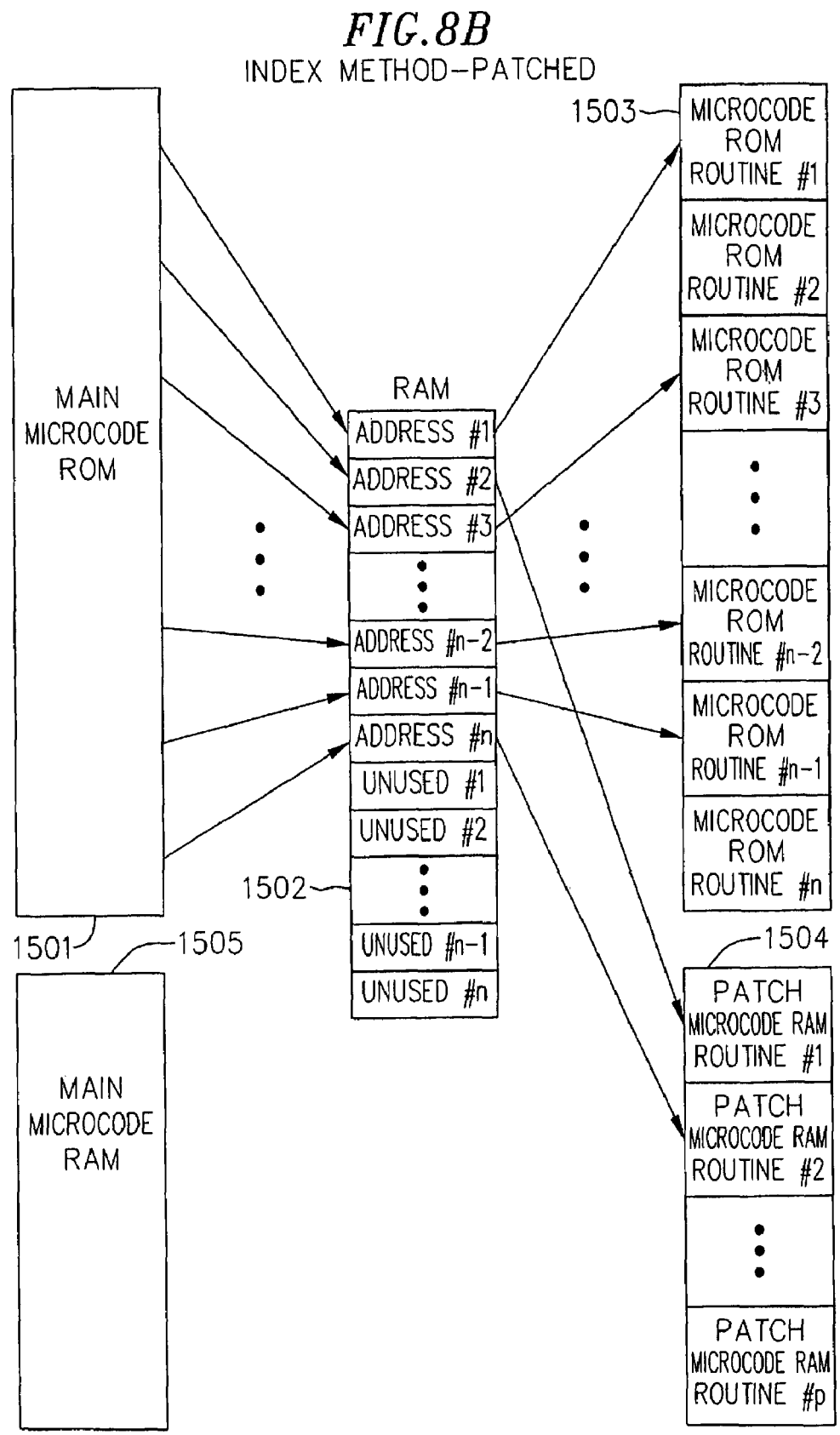
Figure 8C:
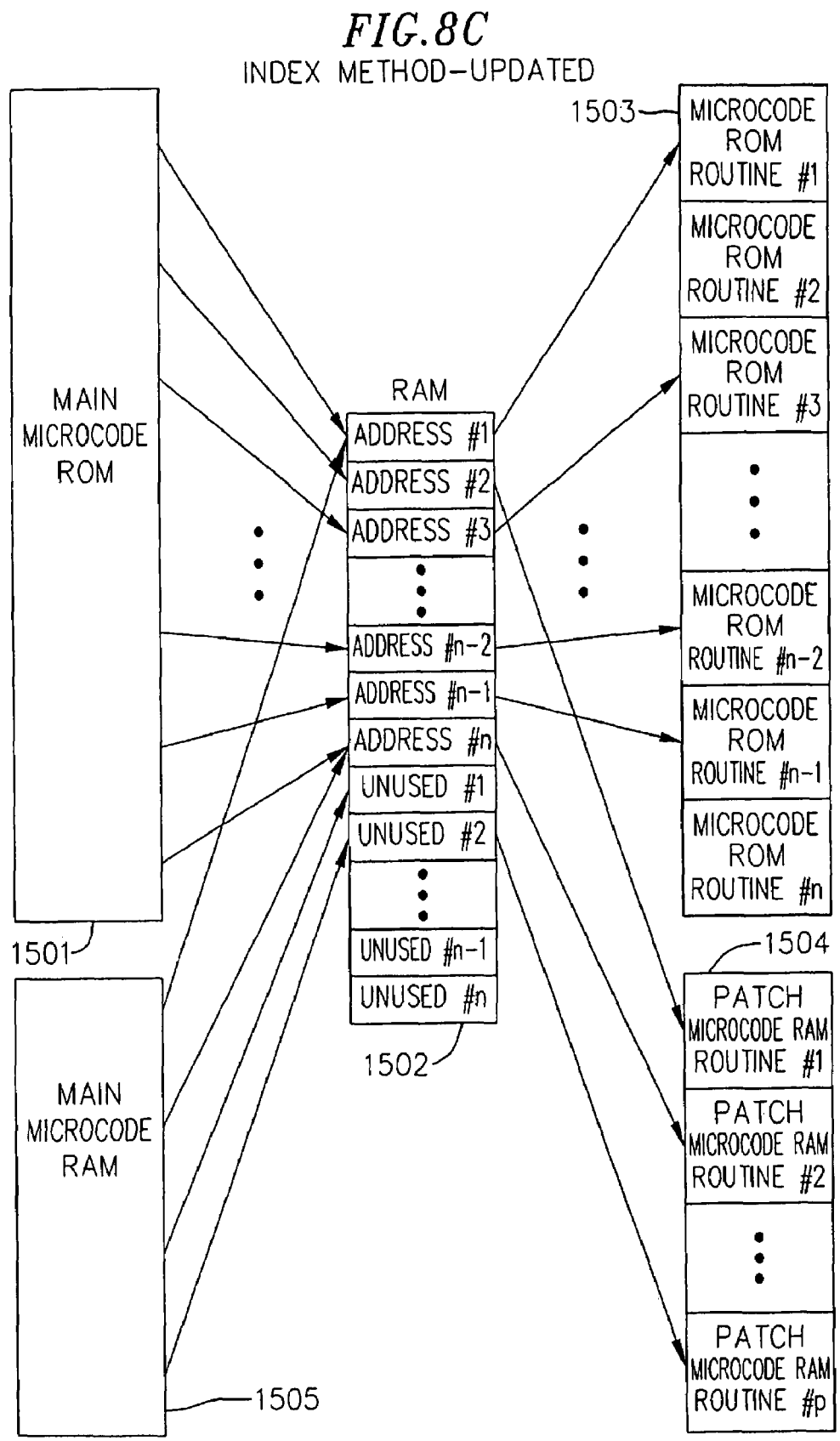
Figure 14:
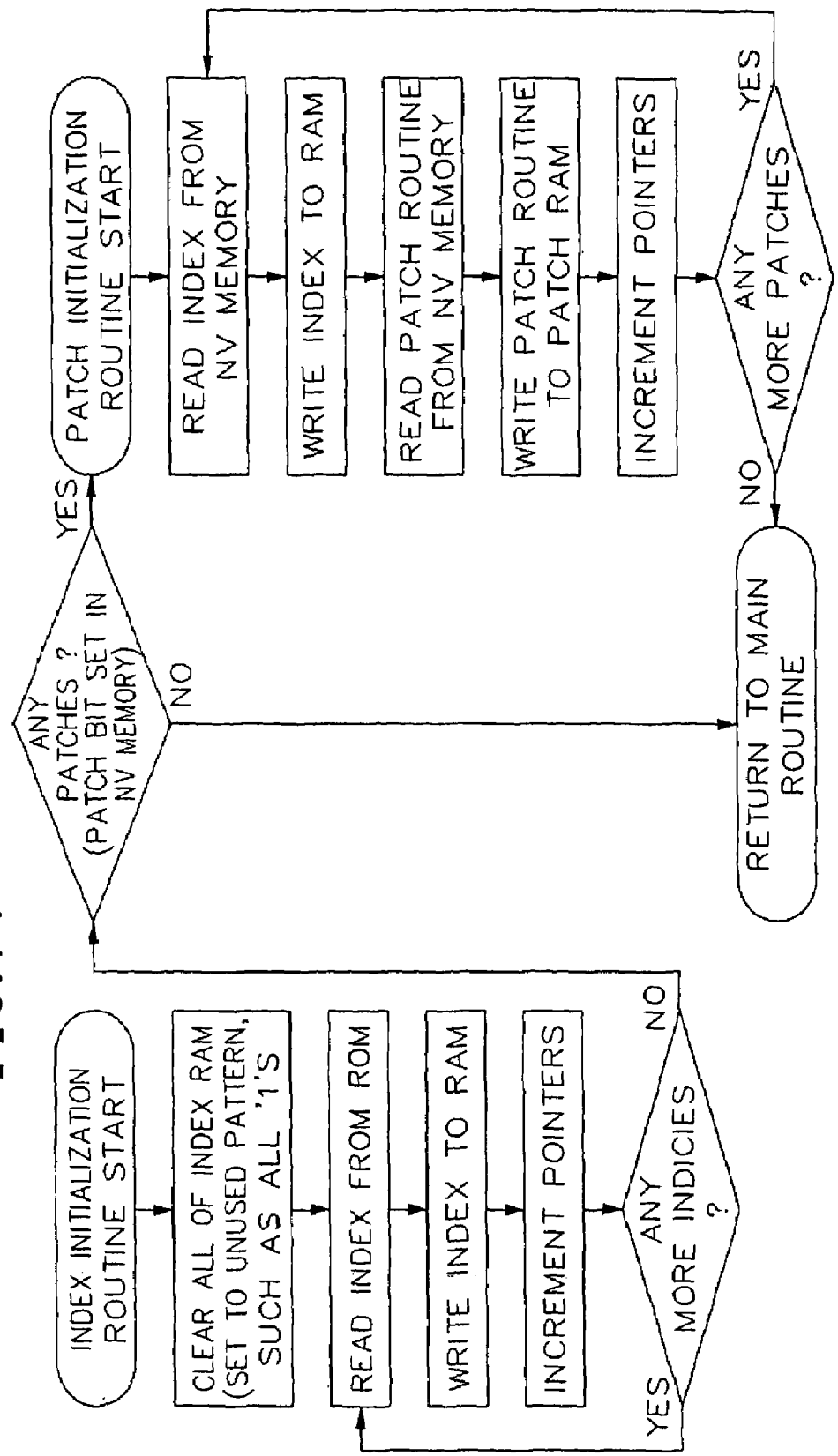
FIG. 14 is a programming flow chart showing a microcode patch initialization routine.

FIGS. 8A through 8C illustrate one embodiment in which a portion of system RAM is used to store the address location for each ROM microcode routine or instruction. The addresses are loaded into RAM when the system is initialized on startup, or when a patch to system ROM microcode is received. FIG. 14 is a logic flowchart for a software routine to load the subject addresses into RAM. When a microcode routine or instruction is to be executed, the system is directed to obtain the microcode address from RAM. As shown in FIG. 8A, if there has been no change or addition to the microcode, the system will be directed to a ROM address, whereupon it will execute the routine or instruction stored in ROM. As illustrated in FIG. 8B, if a patch has been received and loaded in the patch RAM, the applicable RAM address will be substituted for the corresponding ROM instruction address and the routine executed in order from the patch RAM.

Figure 9:
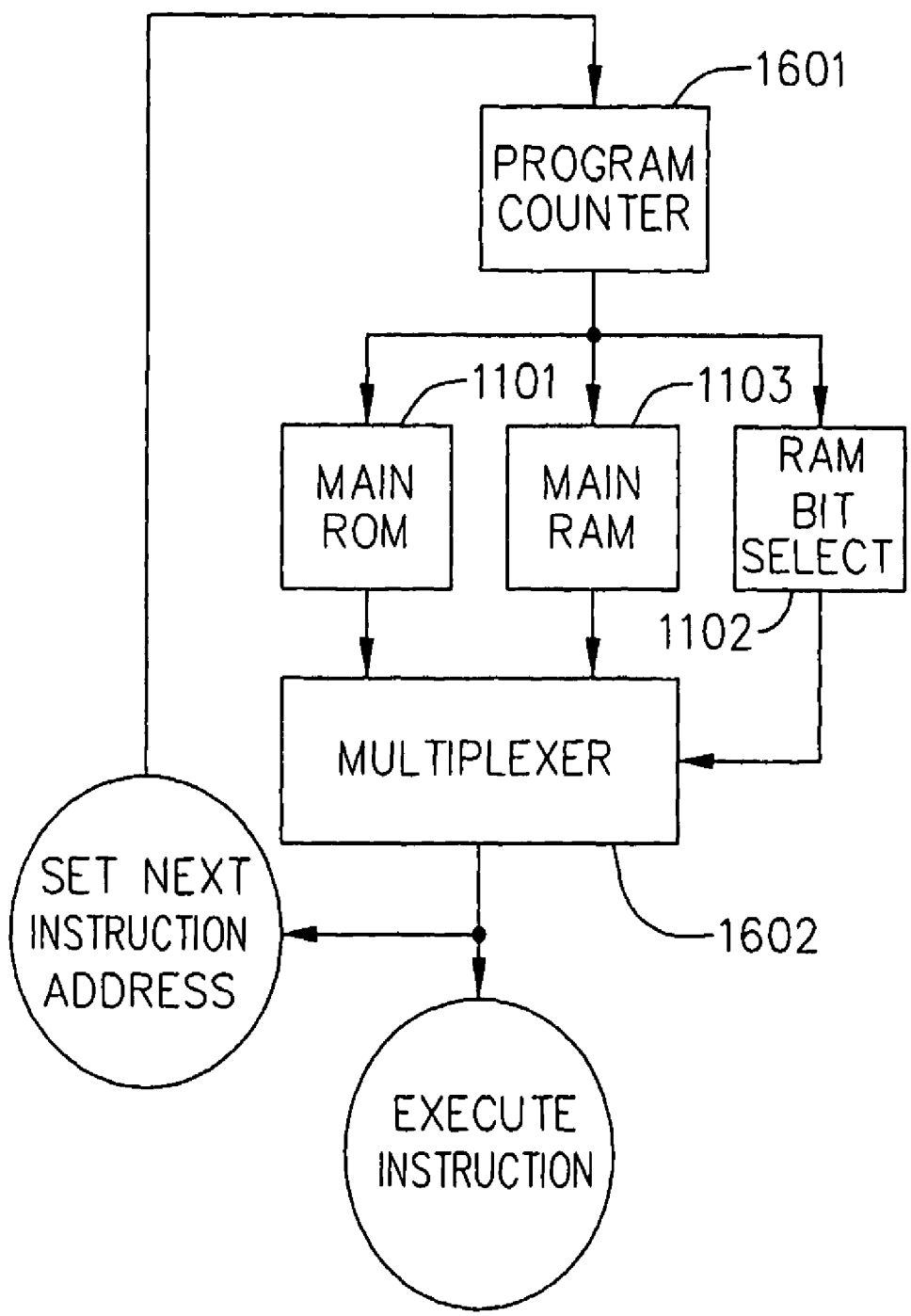
FIG. 9 is a block diagram showing the functional implementation of the memory architecture illustrated in FIG. 4.

FIG. 9 illustrates a system for implementing the memory architecture shown in FIG. 4. To execute a microcode instruction, the program counter (1601) simultaneously addresses main ROM (1101), main RAM (1103), and a RAM select bit (1102). The ROM (1101) microcode and RAM (1103) microcode held in the selected address are input to a multiplexer (1602). The RAM select bit (1102) is used by the multiplexer to control the selection of ROM microcode or RAM microcode as the output of the multiplexer. Depending upon the status of the select bit, the multiplexer selects either the ROM microcode or the RAM microcode for output and further processing. The microcode selected for output from the multiplexer is then executed and the program counter incremented or branched as necessary to initiate the next microcode instruction routine.

Figure 5:
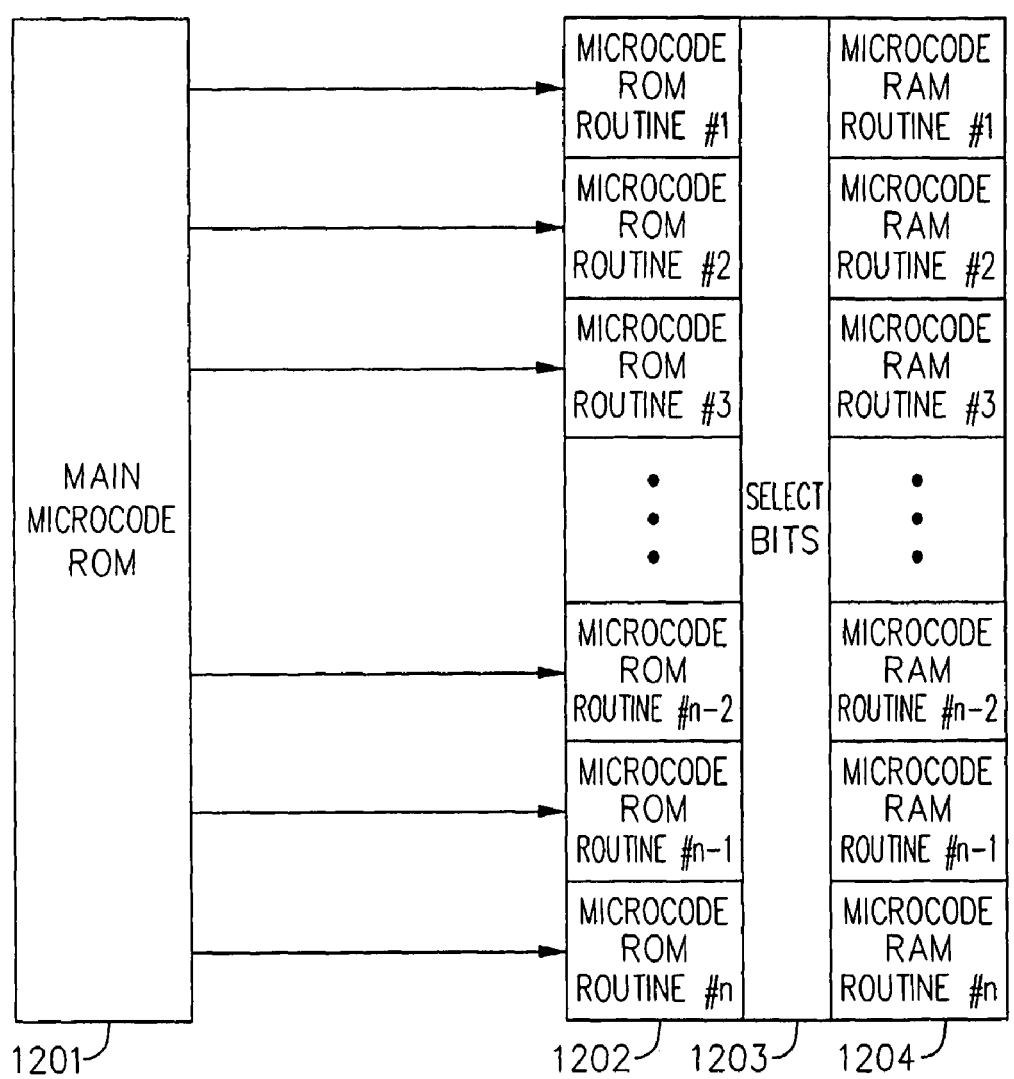
FIG. 5 illustrates a memory architecture in which main microcode ROM is mapped to a common memory address area shared by microcode ROM routines and corresponding microcode RAM routines, along with a "select" RAM bit used to control the selection of microcode ROM routines or microcode RAM routines.
Figure 10:
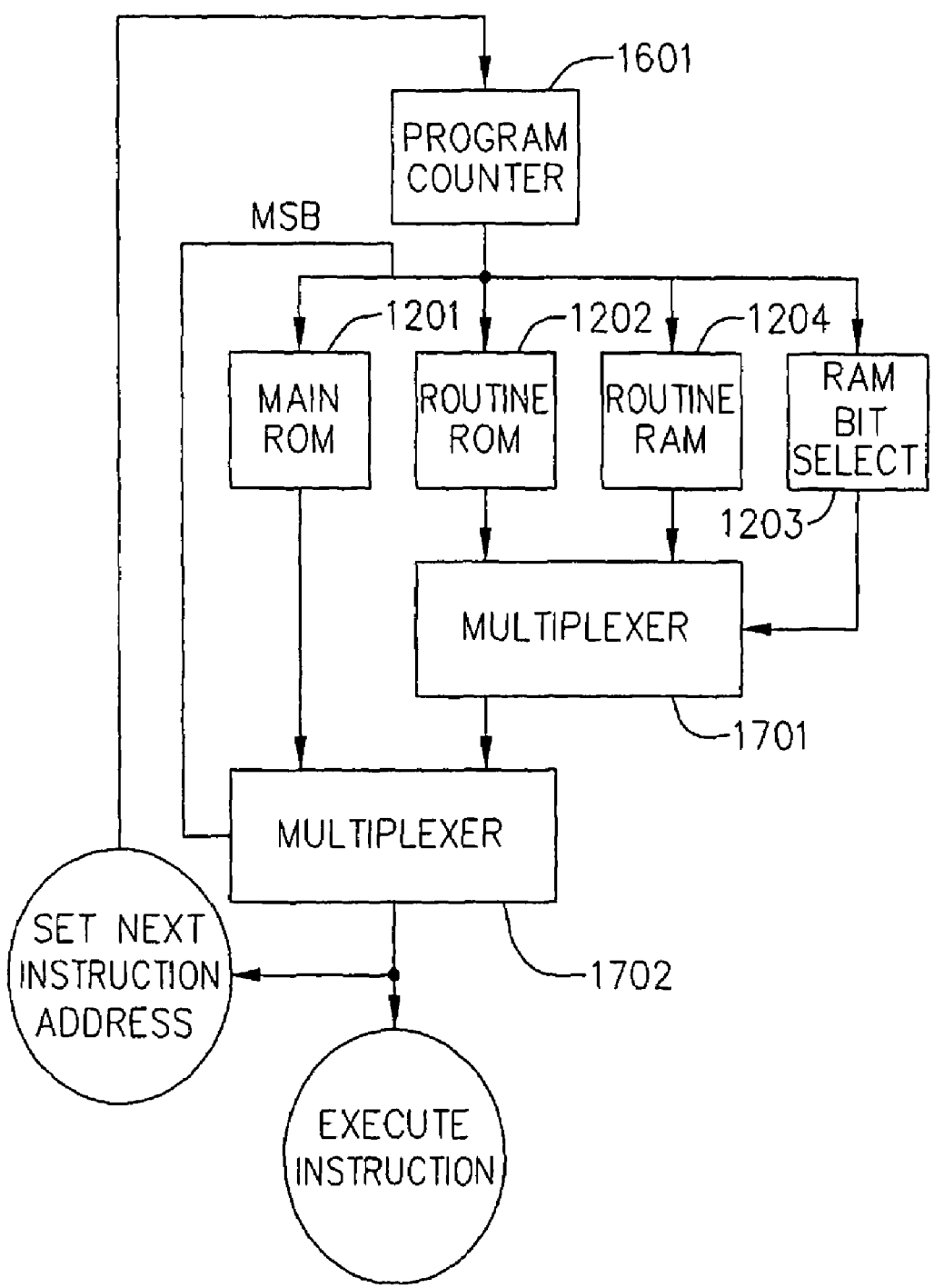
FIG. 10 is a block diagram showing the functional implementation of the memory architecture illustrated in FIG. 5.

FIG. 10 illustrates a system for implementing the memory architecture shown in FIG. 5. Here, the program counter (1601) simultaneously addresses main ROM (1201), routine ROM (1202), routine RAM (1204), and the RAM select bit (1203). The routine ROM (1202) and routine RAM (1204) microcode are input to a multiplexer (1701). The RAM select bit (1203) is used by the multiplexer to control the selection of routine ROM microcode or routine RAM microcode as the output of the multiplexer. Depending upon the status of the select bit, the multiplexer selects either the routine ROM microcode or the routine RAM microcode for output and further processing. The selected output from multiplexer 1701 is input to another multiplexer (1702). Main ROM microcode (1201) is also input to multiplexer 1702. The most significant bit (MSB) or other control bit from the program counter is used to select the output of multiplexer 1702. Depending upon the status of the MSB or other control bit, main ROM microcode or the output of multiplexer 1701 (routine ROM or routine RAM microcode) is selected for output and further processing. The microcode selected for output from multiplexer 1702 is then executed and the program counter incremented or branched as required to initiate the next microcode instruction.

Figure 6A:
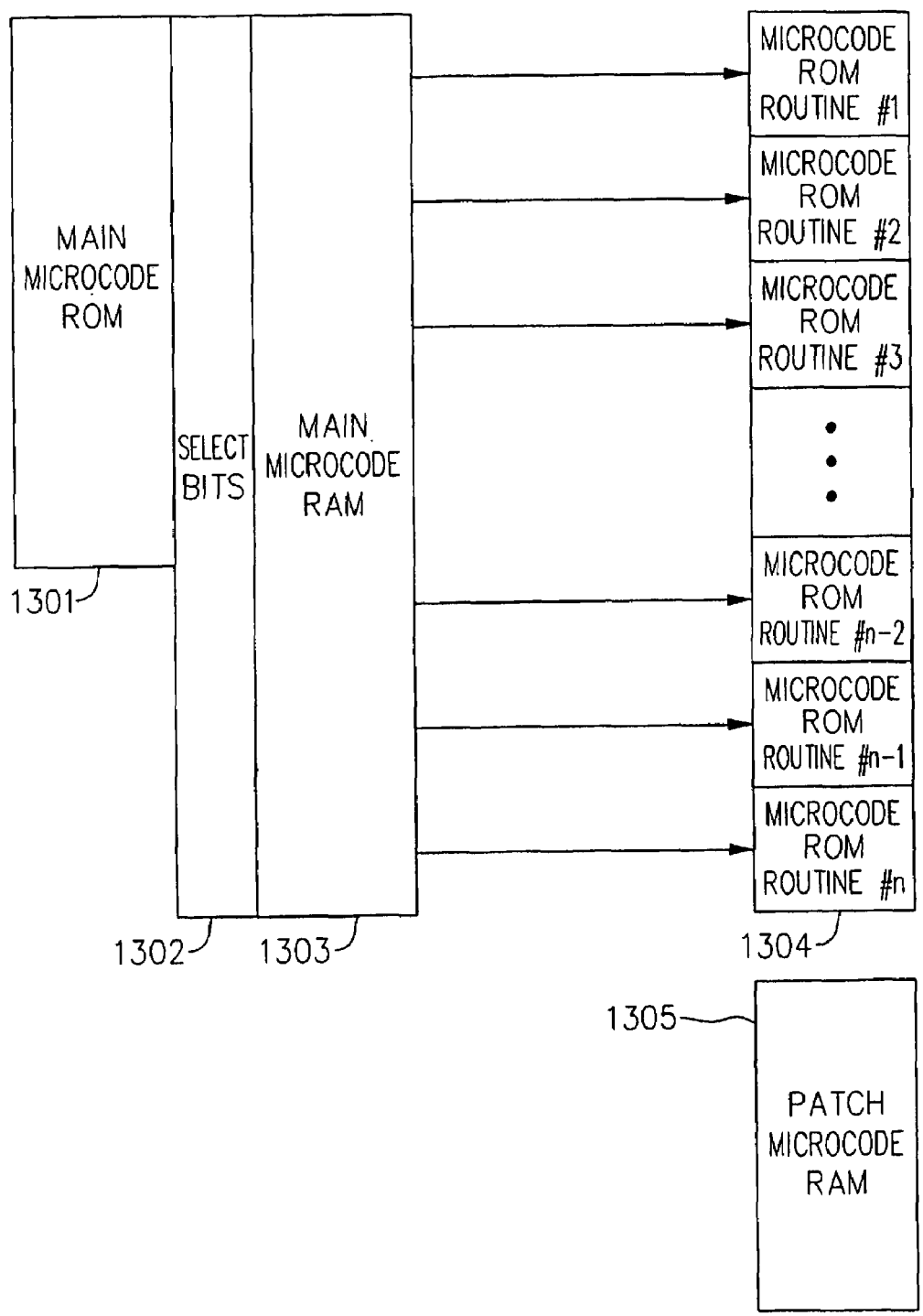
Figure 6C:
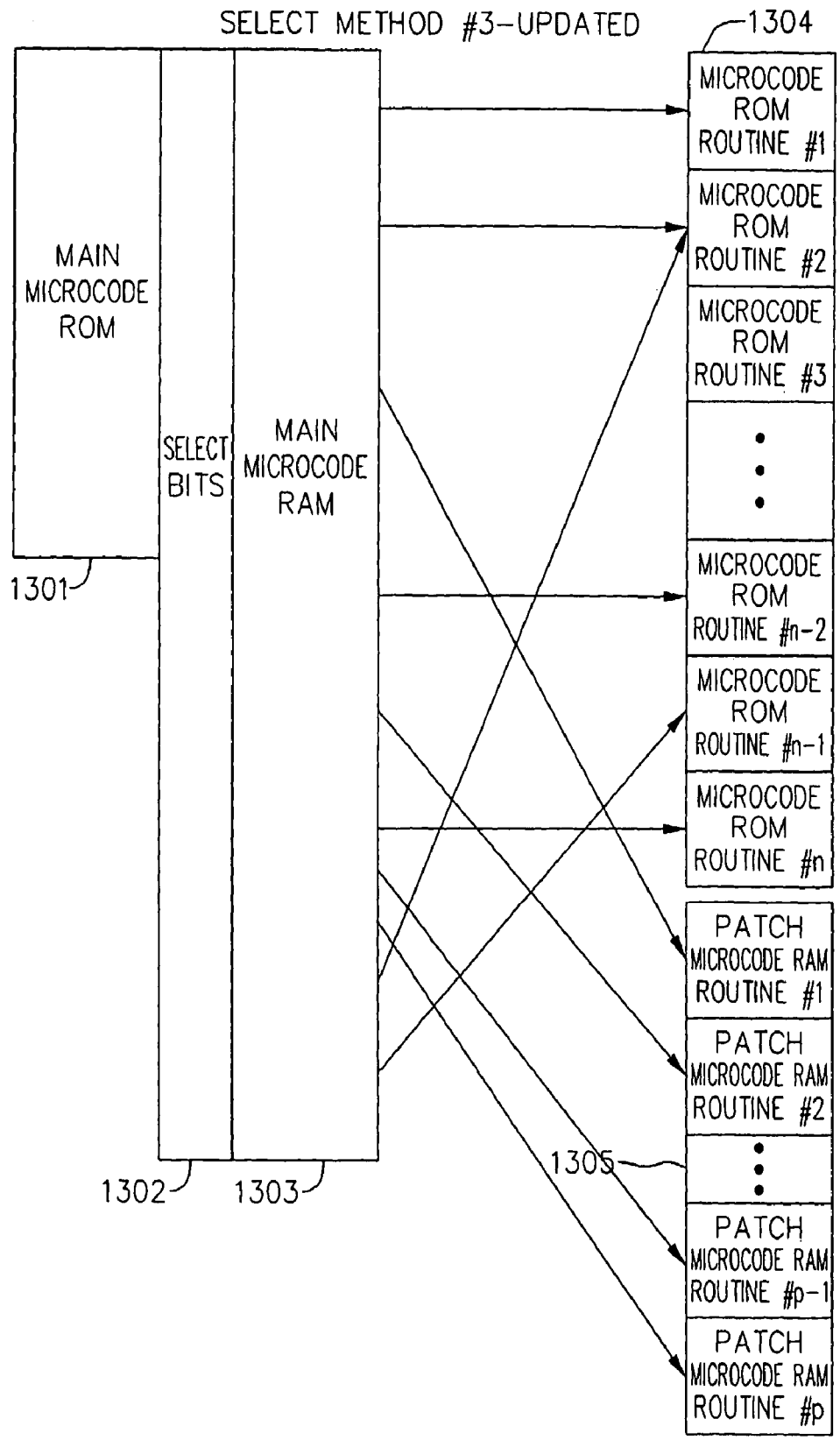
Figure 11:
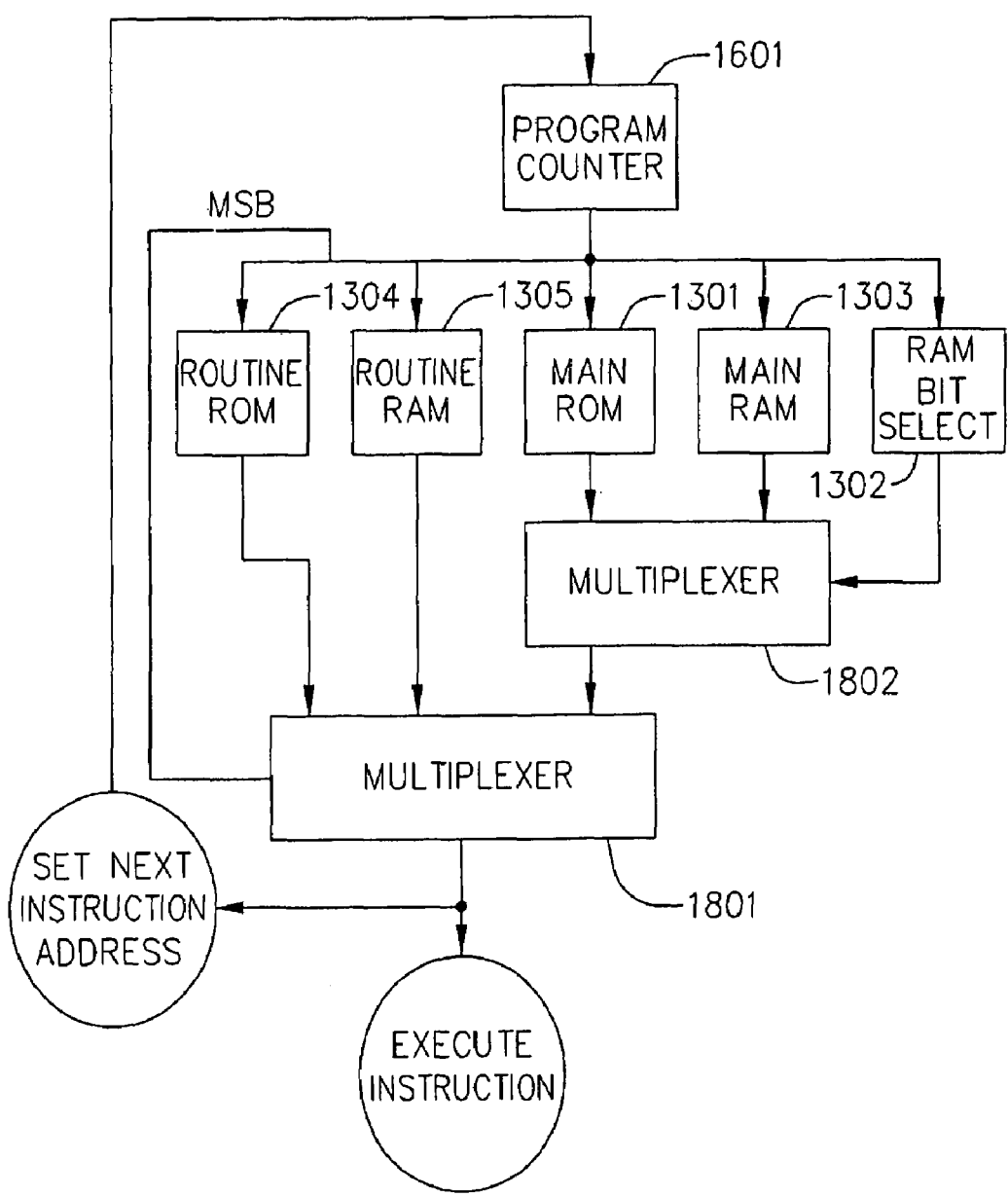
FIG. 11 is a block diagram showing the functional implementation of the memory architecture illustrated in FIGS. 6A, 6B, and 6C.

FIG. 11 illustrates a system for implementing the memory architecture shown in FIGS. 6A, 6B, and 6C. In this case, the program counter (1601) simultaneously addresses main ROM (1301), main RAM (1303), routine ROM (1304), routine RAM (1305), and the RAM select bit (1302). The addressed main ROM microcode and main RAM microcode are used as inputs to multiplexer 1802. The RAM select bit (1302) is used to control the output of multiplexer 1802, either main ROM microcode or main RAM microcode. This output is then directed to multiplexer 1801. Routine ROM microcode (1304) and routine RAM microcode (1305) are also input to multiplexer 1801. The most significant bits (MSB) or other control bits from the program counter are used to select the output of multiplexer 1801. Depending upon the status of the MSBs or other control bits, routine ROM microcode, routine RAM microcode, or the output of multiplexer 1802 (main ROM or main RAM microcode) is selected for output and further processing. The microcode selected for output from multiplexer 1801 is then executed and the program counter incremented or branched as required to initiate the next microcode instruction.

Figure 7B:
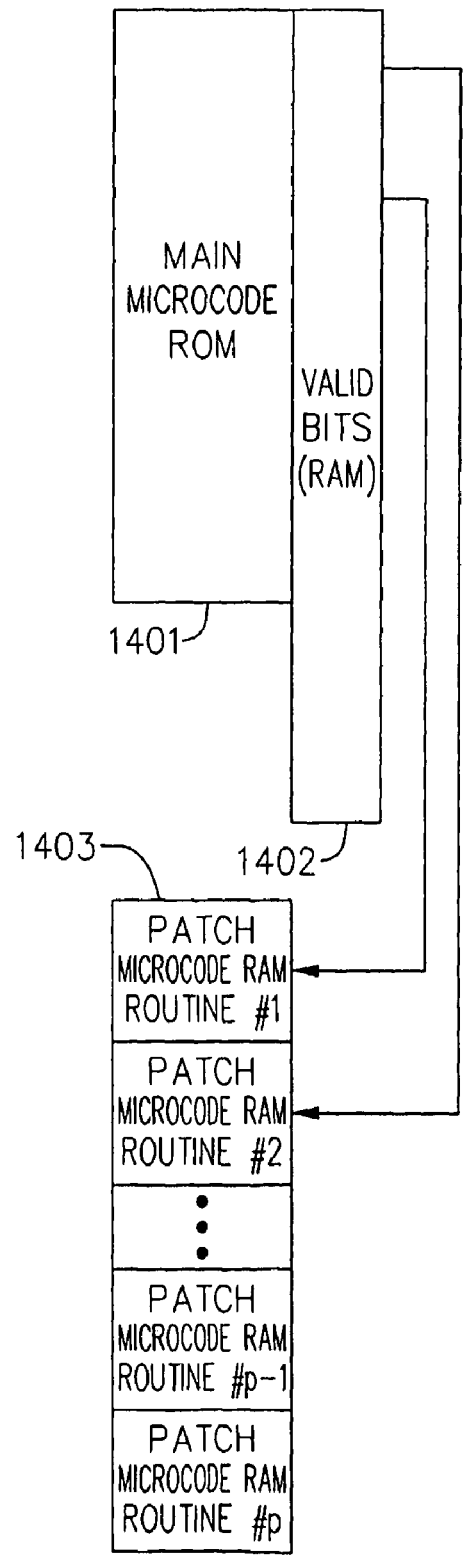
Figure 7C:
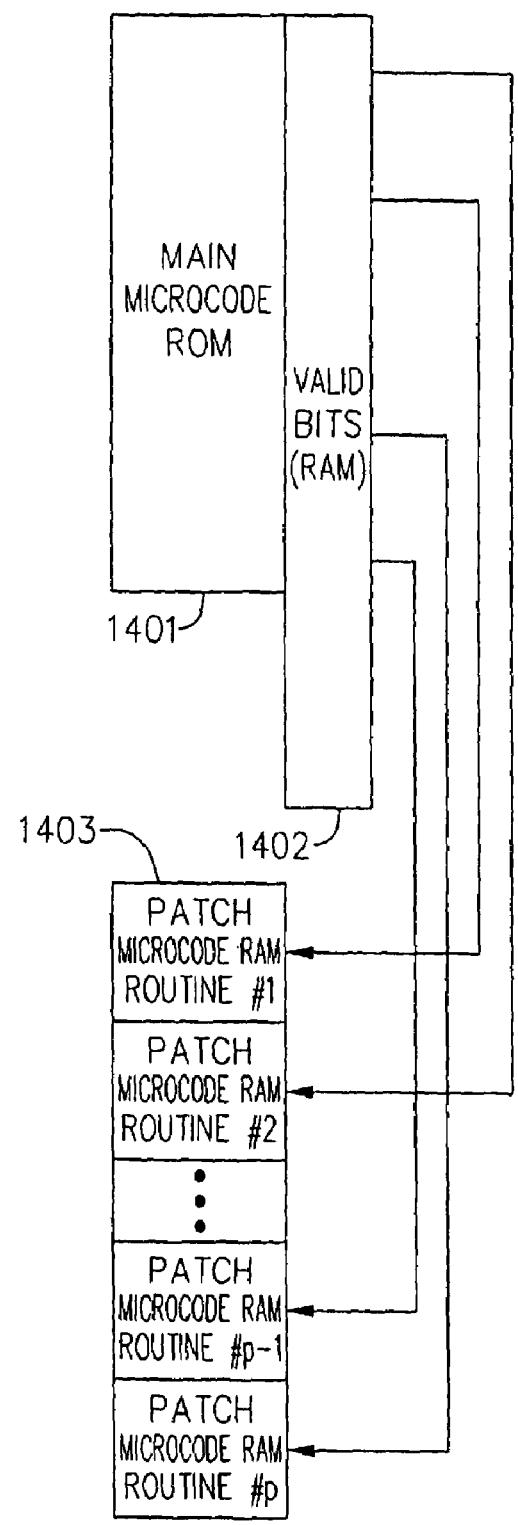
Figure 12:
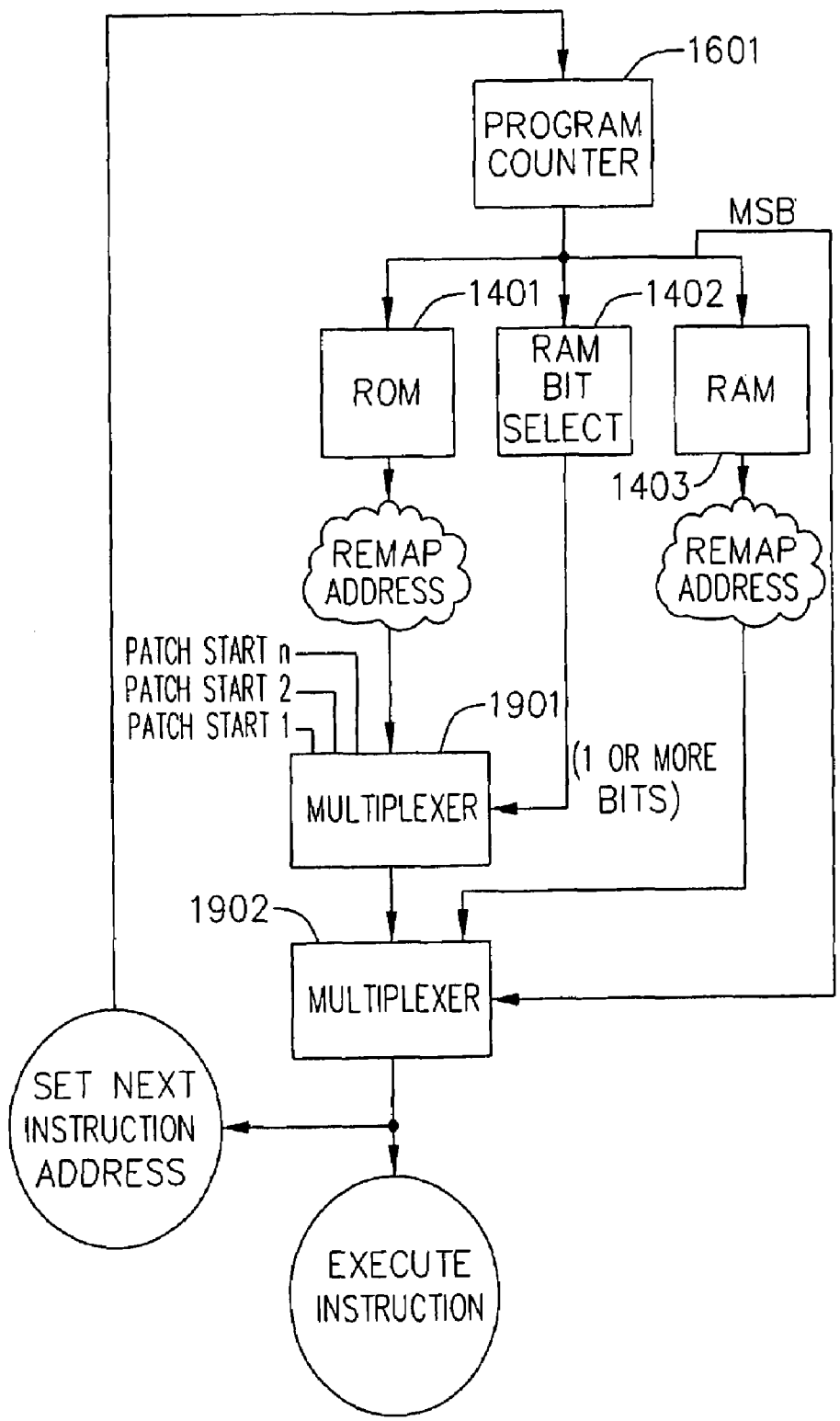
FIG. 12 is a block diagram showing the functional implementation of the memory architecture illustrated in FIGS. 7A, 7B, and 7C.

FIG. 12 illustrates a system for implementing the memory architecture shown in FIGS. 7A, 7B, and 7C. The program counter (1601) simultaneously addresses ROM (1401), RAM (1403), and the RAM select bit (1402). The ROM instruction is re-mapped by a logic circuit and then input to a multiplexer (1901) along with the available RAM patch routines. The routine to be selected is controlled by 1 or more RAM select bits (the number of bits determined by the number of potential patch routines). The selected routine is input to another multiplexer (1902), along with the re-mapped address of RAM instructions (1403). The selection from multiplexer 1902 is controlled by the most significant bit (MSB) of the program counter. The output instruction from multiplexer 1902 is executed and the address for the next instruction determined and forwarded to the program counter.

Figure 13:
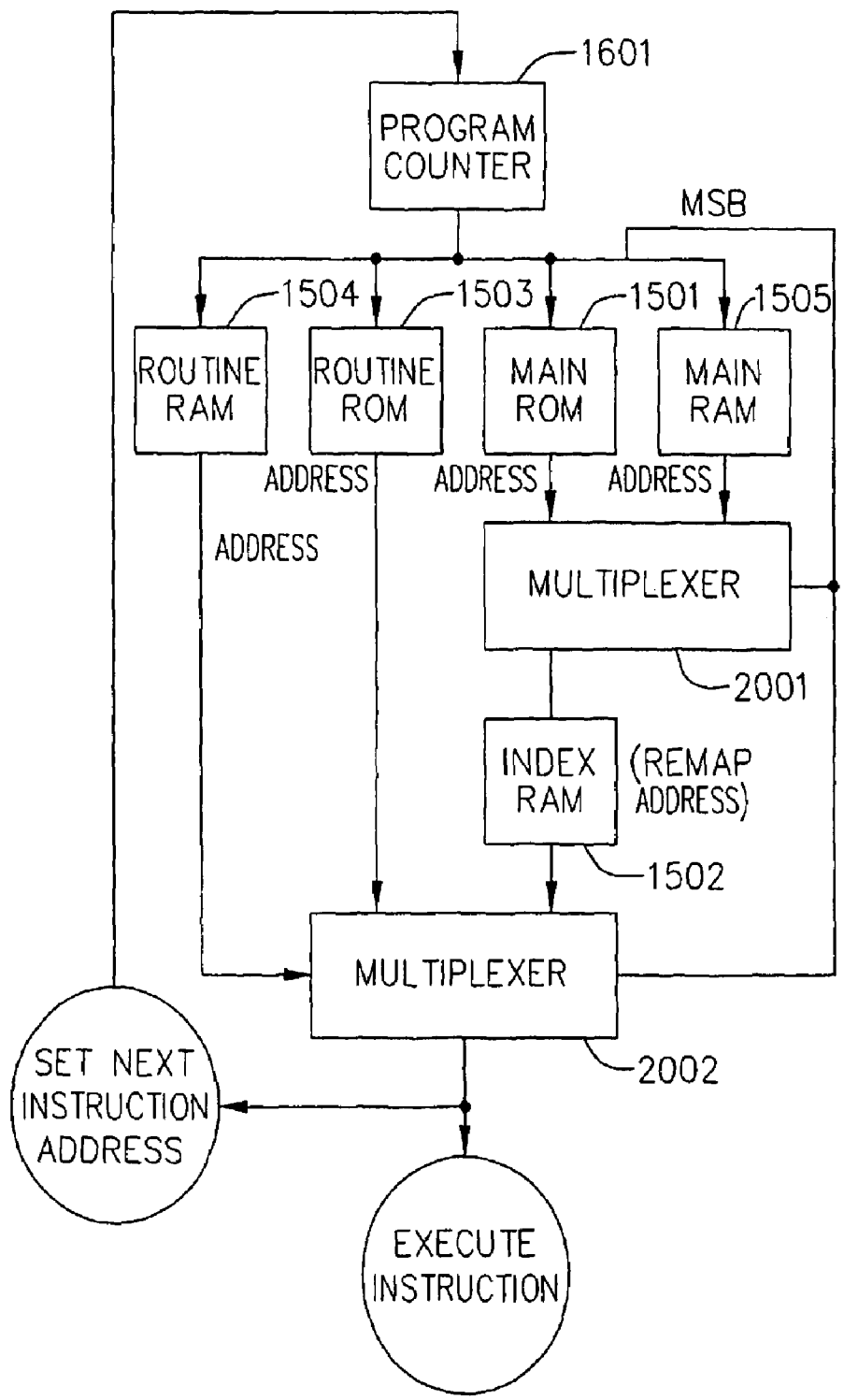
FIG. 13 is a block diagram showing the functional implementation of the memory architecture illustrated in FIGS. 8A, 8B, and 8C.

FIG. 13 illustrates a system for implementing the memory architecture shown in FIGS. 8A, 8B, and 8C. Program counter 1601 simultaneously addresses routine ROM (1503), main ROM (1501), main RAM (1505), and routine RAM (1504). The main RAM and main ROM microcode are used as inputs to multiplexer 2001. The most significant bits (MSB) or other control bits from the program counter are used to select the output of multiplexer 2001. Depending upon the status of the MSBs or other control bits, main ROM microcode or main RAM microcode is selected for output from multiplexer 2001. The selected address is then referenced to the index RAM (1502), remapped as necessary and input to multiplexer 2002. Routine ROM microcode and routine RAM microcode are input to multiplexer 2002. Again, the most significant bit (MSB) or other control bit from the program counter is used to select the output of multiplexer 2002. Depending upon the status of the MSB or other control bit, routine ROM microcode, routine RAM microcode, remapped main RAM or remapped main ROM is selected for output and further processing.

FIG. 14 is a programming flow chart showing a microcode patch initialization routine for the memory architecture depicted in FIGS. 8A, 8B, and 8C. After program initialization, all index RAM locations are set to the unused pattern (such as all "is"). An index is read from ROM and written to RAM, and pointer incremented to show the next index location. The process is repeated until all indexes are initialized in order. Once the indexes are initialized, the presence of a microcode patch is queried from non-volatile memory by, for example, sampling the status of a designated "patch" bit. If a patch is detected, its index is read from non-volatile memory and written to the corresponding RAM index location. The patch routine is then read from non-volatile memory and written to the designated patch RAM area of memory. The process is repeated until all patches have been indexed and written to RAM. Those skilled in the art will understand that this is only one of many possible programs for loading patched microcode into RAM and indexing its location(s) As one skilled in the art understands, data processing circuit 302 described above may further comprise a context switching circuit as described in U.S. patent application Ser. No. 09/592,009, filed Jun. 12, 2000, the content of which is incorporated by reference herein in its entirety.

What is claimed is:

1. A Bluetooth receiver comprising:
a receiver circuit adapted to receive a wireless signal having a frequency of about 2.4 GHz;
a demodulator coupled to the receiver circuit, the demodulator adapted to recover a data signal and a first clock signal from a signal output by the receiver circuit;
a host adapted to generate a second clock signal;
a first-in first-out memory (FIFO) coupled to the demodulator and adapted to to receive the data signal and the first clock signal,
wherein the FIFO is adapted to store the data signal in synchronization with the first clock signal, and wherein the FIFO is coupled to the host to receive the second clock signal.

2. The Bluetooth device of claim 1, wherein the FIFO is adapted to output an output data signal in synchronization with the second clock signal.

3. The Bluetooth device of claim 2, wherein the FIFO is adapted to store the data signal and to output the output data signal at substantially the same rate.

4. The Bluetooth device of claim 2, wherein the host is coupled to the FIFO to receive the output data signal from the FIFO.

5. The Bluetooth device of claim 2, further comprising a data processing circuit coupled to the FIFO to receive the output data signal.

6. The Bluetooth device of claim 5, wherein the data processing circuit includes at least one of a forward error correction circuit, a cyclical redundancy check circuit, a de-whitening circuit, a second FIFO, a clock, a microcontroller, and/or a host interface to generate a processed data signal.

7. The Bluetooth device of claim 5, wherein the host is coupled to the data processing circuit to receive the processed data signal.

8. The Bluetooth device of claim 5, wherein the FIFO further outputs a full or empty signal to the data processing circuit.

9. The Bluetooth device of claim 1, wherein the FIFO is adapted to output an output data signal at substantially the same rate at which the data signal is stored in the FIFO.

10. The Bluetooth device of claim 1, wherein the FIFO is coupled to the host to output an output data signal to the host.

11. The Bluetooth device of claim 1, wherein the wireless signal is transmitted from a second Bluetooth device.

12. A Bluetooth device system comprising:
a receiver circuit adapted to receive a wireless signal having a frequency of about 2.4 GHz;
a demodulator coupled to the receiver circuit, the demodulator adapted to recover a data signal and at least one clock signal from at least one signal output by the receiver circuit;
a host adapted to generate a read signal;
and a first-in first-out memory coupled to the demodulator and adapted to receive the data signal and the at least one clock signal, wherein the first-in first-out memory is adapted to store the data signal in response to the at lest one clock signal, and wherein the first-in first-out memory is coupled to the host to receive the read signal;
wherein the host is adapted to read the data signal from the first-in first-out memory without synchronizing a clock to the at least one clock signal.

13. The Bluetooth device system of the claim 12 wherein the read signal is synchronized with a host clock signal.

14. The Bluetooth device system of claim 12 wherein the host is adapted to operate at a higher speed than the at least one clock signal.

15. The Bluetooth device system of claim 12 wherein the host is adapted to read the data signal from the first-in first-out memory in bursts.

16. The Bluetooth device system of claim 12 wherein the first-in first-out memory is sized in accordance with a variation between a rate at which the first-in first-out memory is written and a rate at which the first-in first-out memory is read.

17. The Bluetooth device system of claim 12 wherein the first-in first-out memory is sized in accordance with a length of data transmitted.

18. The Bluetooth device system of claim 12 wherein the first-in first-out memory is sized in accordance with a product of a length of data transmitted and a variation between a rate at which the first-in first-out memory is written and a rate at which the first-in first-out memory is read.

19. The Bluetooth device of claim 12, wherein the wireless signal is transmitted from a second Bluetooth device.

* * * * *